United States Patent
Kin et al.

(10) Patent No.: US 7,206,525 B2
(45) Date of Patent: Apr. 17, 2007

(54) IMAGE FORMING APPARATUS, A TONER COUNTER AND A CALCULATION METHOD OF TONER CONSUMPTION

(75) Inventors: Hidenori Kin, Nagano-ken (JP); Takatoshi Sugita, Nagano-ken (JP); Isao Inaba, Nagano-ken (JP); Ken Ikuma, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 147 days.

(21) Appl. No.: 11/014,501

(22) Filed: Dec. 15, 2004

(65) Prior Publication Data
US 2005/0141905 A1 Jun. 30, 2005

(30) Foreign Application Priority Data
Dec. 26, 2003 (JP) ............................ 2003-434203
Dec. 26, 2003 (JP) ............................ 2003-434204
Dec. 1, 2004 (JP) ............................ 2004-348894

(51) Int. Cl.
*G03G 15/08* (2006.01)
(52) U.S. Cl. ...................................... 399/27
(58) Field of Classification Search ................ 399/24, 399/27, 53, 60, 61
See application file for complete search history.

(56) References Cited

U.S. PATENT DOCUMENTS

| | | | | |
|---|---|---|---|---|
| 5,724,627 A | * | 3/1998 | Okuno et al. | ............. 399/27 |
| 5,794,094 A | * | 8/1998 | Boockholdt et al. | ........... 399/27 |
| 6,366,744 B1 | * | 4/2002 | Phillips et al. | ................. 399/24 |
| 6,476,837 B2 | * | 11/2002 | Ogata | ......................... 399/27 X |
| 6,516,160 B1 | * | 2/2003 | Rodriguez | .................... 399/27 |
| 6,553,190 B1 | * | 4/2003 | Rodriguez | .................... 399/27 |

FOREIGN PATENT DOCUMENTS

JP    2002-162800    6/2002

* cited by examiner

*Primary Examiner*—Sandra L. Brase
(74) *Attorney, Agent, or Firm*—Hogan & Hartson LLP

(57) ABSTRACT

The content of processing of an input image signal varies depending upon the conditions of an apparatus. In view of the fact that this results in the variations of correlation between tone data and toner consumption, a coefficient by which an integration value of the tone data is defined according to the content of the signal processing. In an image forming apparatus which performs tone correction as the signal processing and which has a characteristic (2) of forming images of higher densities relative to tone levels, for example, a larger amount of toner is consumed. Therefore, the coefficient of the apparatus is defined to be a higher value than that of an apparatus having a substantially linear characteristic (1). Conversely, in the case of an apparatus having a characteristic (3) of forming images of lower densities, thus consuming less toner, the coefficient is defined to be a lower value.

33 Claims, 19 Drawing Sheets

FIG. 7

| RANK INFORMATION | TONER CHARGE PER UNIT MASS | CORRECTION COEFFICIENT K |
|---|---|---|
| 1 | LARGE | 0.348 |
| 2 | MEDIUM | 0.452 |
| 3 | SMALL | 0.555 |

FIG. 11

| STATE OF LIFE OF PHOTOSENSITIVE MEMBER | NUMBER OF FORMED IMAGES | CORRECTION COEFFICIENT K |
|---|---|---|
| INITIAL | SMALL | 0.435 |
| INTERMEDIATE | MEDIUM | 0.403 |
| END | LARGE | 0.357 |

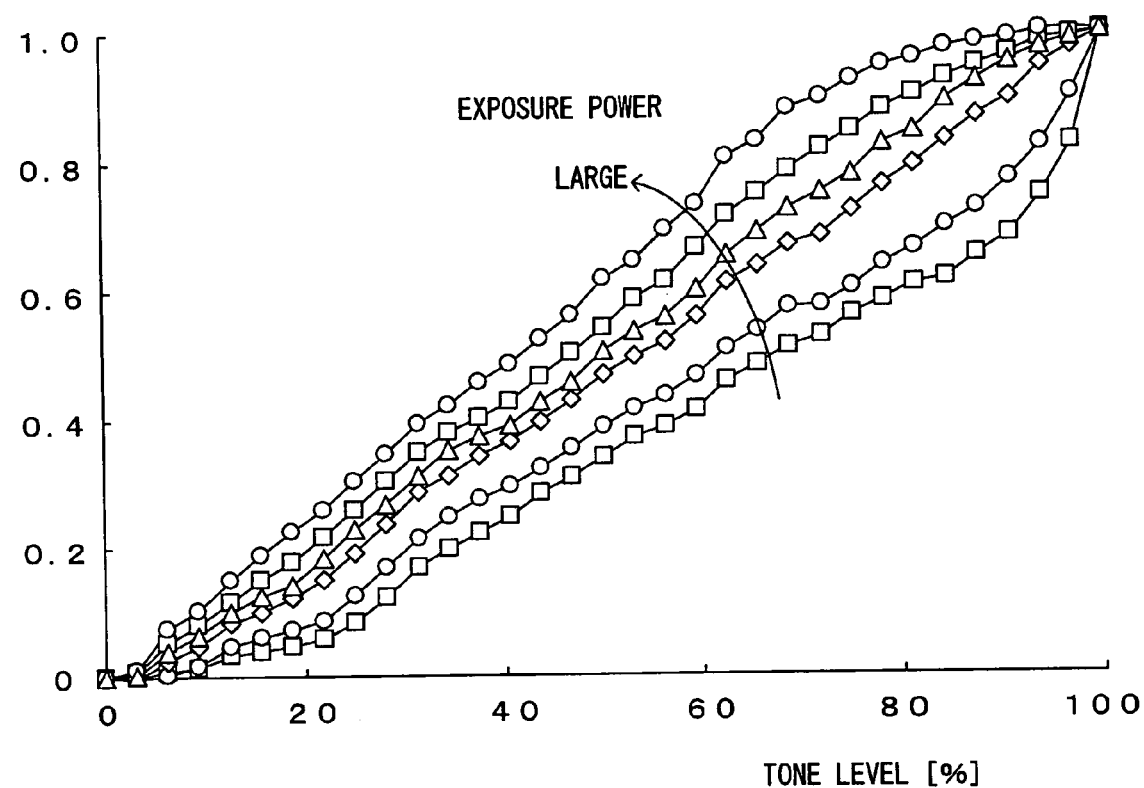
F I G. 1 2

FIG. 17

| DENSITY RANK OF P50 | TONE-LEVEL RANK RELATED TO D50 | GAMMA CHARACTERISTIC OF ENGINE | CORRECTION COEFFICIENT K |
|---|---|---|---|
| R1 | I | SUBSTANTIALLY LINEAR | 0.502 |
| R2 | II | UPWARDLY PROTRUDED | 0.554 |
| R3 | III | DOWNWARDLY PROTRUDED | 0.451 |

IMAGE FORMING APPARATUS, A TONER COUNTER AND A CALCULATION METHOD OF TONER CONSUMPTION

CROSS REFERENCE TO RELATED APPLICATION

The disclosure of Japanese Patent Applications enumerated below including specifications, drawings and claims is incorporated herein by reference in its entirety:
No. 2003-434203 filed Dec. 26, 2003;
No. 2003-434204 filed Dec. 26, 2003; and
No. 2004-348894 filed Dec. 1, 2004.

BACKGROUND OF THE INVENTION

1. Field of the Invention

The present invention relates to a technique for calculating toner consumption in an image forming apparatus.

2. Description of the Related Art

In electrophotographic image forming apparatuses, such as printers, copiers and facsimiles, which form images using a toner, a need exists for figuring out toner consumption or residual quantity of toner as a matter of convenience for maintenance services such as toner replenishment. Particularly, the recent years have seen increasing demands for allowing a toner charged in the apparatus to be used as effectively as possible or with minimum toner waste, while exactly predicting time when the toner is used up, as well as for preventing the degradation of image quality as a result of shortage of the remaining toner. Hence, the image forming apparatuses of this type are faced with a demand for further increasing the accuracies of toner counting technique.

In response to such demands, there have heretofore been proposed techniques for accurately determining the toner consumption. According to a calculation method of toner consumption as disclosed in Japanese Patent Application Laid-Open Gazette No. 2002-162800, for instance, the toner consumption is calculated as follows. A cumulative value of a print dot for each color, inputted to a pulse modulator circuit, is integrated on a certain-unit basis, such as on a per-page basis or on a job-unit basis. The resultant integration value is multiplied by a predetermined coefficient. Then, an offset value is added to the product so as to determine the toner consumption for each color.

In the image forming apparatuses of this type, individual apparatuses have delicate distinctions in the characteristics thereof. Even in one apparatus, the characteristics thereof may delicately vary depending upon the use conditions thereof. Because of this, an amount of toner to be used for forming the same image varies from apparatus to apparatus. Under some use conditions, even one apparatus does not always use a constant amount of toner to form each of the same images. However, the prior art has not adequately contemplated this problem. In many cases, therefore, the varied characteristics of the apparatus or the time-related variations of the characteristics of the apparatus make it difficult to determine the toner consumption accurately.

According to the prior-art technique, however, the unit of count is the number of "print dots", whereas the amount of toner adherent to the intermediate-value dots is calculated on assumption that an equal amount of toner is adhered to each of the dots. That is, the prior-art technique obviates cross study on the amount of toner adherent to the respective types of print dots. As a result, the prior-art technique sometimes falls short of fully meeting the demand for even higher accuracies of the calculation of toner consumption.

SUMMARY OF THE INVENTION

The invention is directed to a further increase of the accuracy of the calculation of toner consumption in the image forming apparatus.

In the present invention for achieving the above object, a toner consumption of the image forming apparatus based on a multivalued signal relating to a toner dot to be formed is calculated in the manner as follows. The toner consumption is calculated by correcting the values of the multivalued signal and integrating thus corrected values, or by correcting a integrated value of the values of the multivalued signal, the correction based on predetermined correction information according to a content of signal processing on the image signal, or on a gamma characteristic of the image forming apparatus.

This approach provides high-accuracy determination of the toner consumption while suppressing the decrease of the calculation accuracy resulting from the varied characteristic of the apparatus.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 7 is a chart showing set values of the correction coefficient according to the first embodiment;

FIG. 11 is a chart showing set values of the correction coefficient according the second embodiment;

FIG. 12 is a graph showing an exemplary relation between the exposure power and the gamma characteristic;

FIG. 17 is a chart showing set values of the correction coefficient according to the third embodiment;

DETAILED DESCRIPTION OF THE
PREFERRED EMBODIMENTS

Now, description will hereinbelow be made on specific embodiments of image forming apparatuses to which toner counting techniques according to the invention are applied. These embodiments are common in a basic construction of the image forming apparatuses, provided that the embodiments individually adopt different calculation methods of toner consumption and different arrangements to carry out the calculation methods. First of all, therefore, the basic construction of the apparatuses common to the embodiments will be described and then, description will be made on the toner counting techniques according to the embodiments.

1. Basic Construction of the Apparatus

Figure 1:
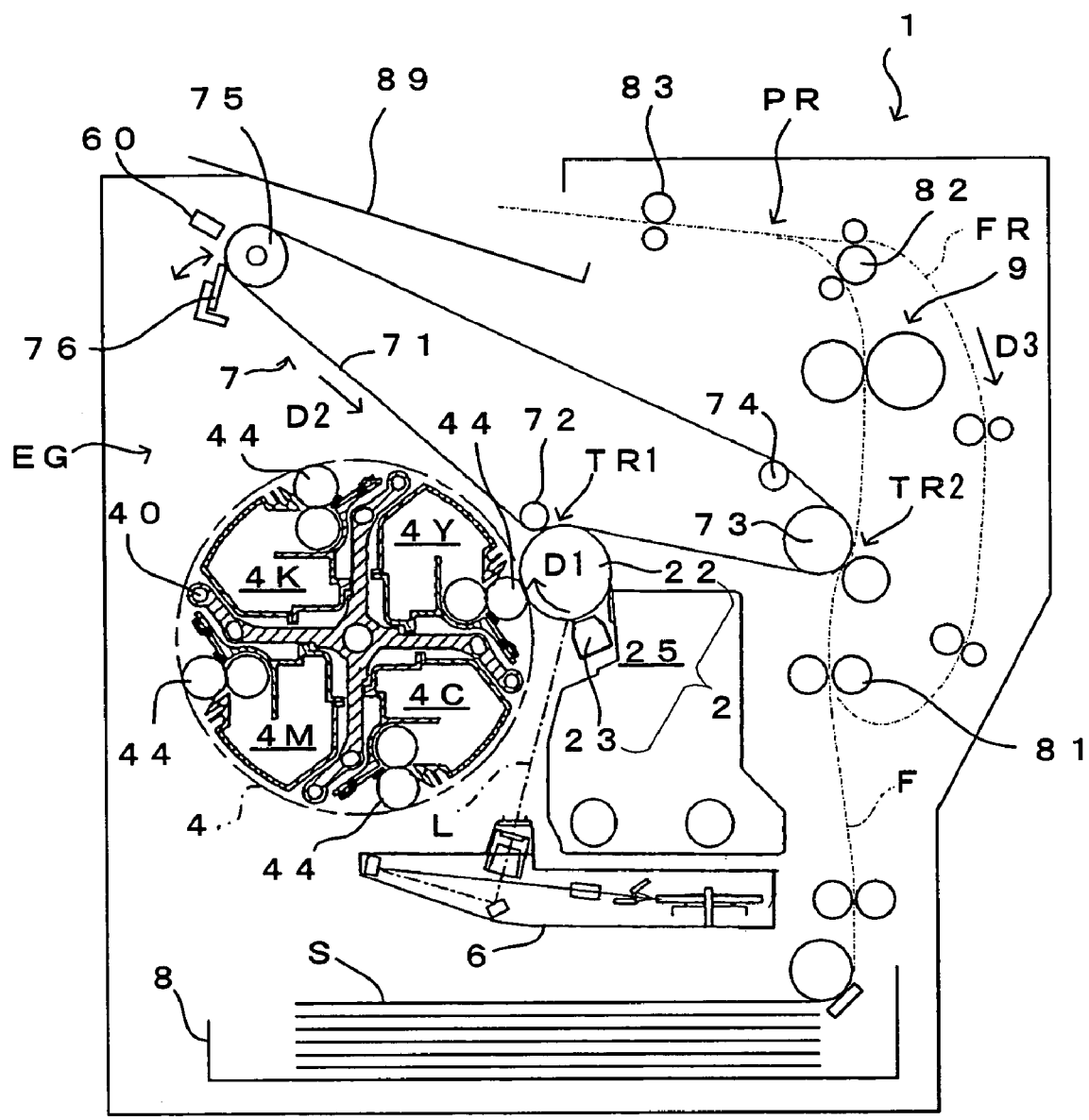
FIG. 1 is a drawing which shows the structure of an image forming apparatus according to the present invention.
Figure 2:
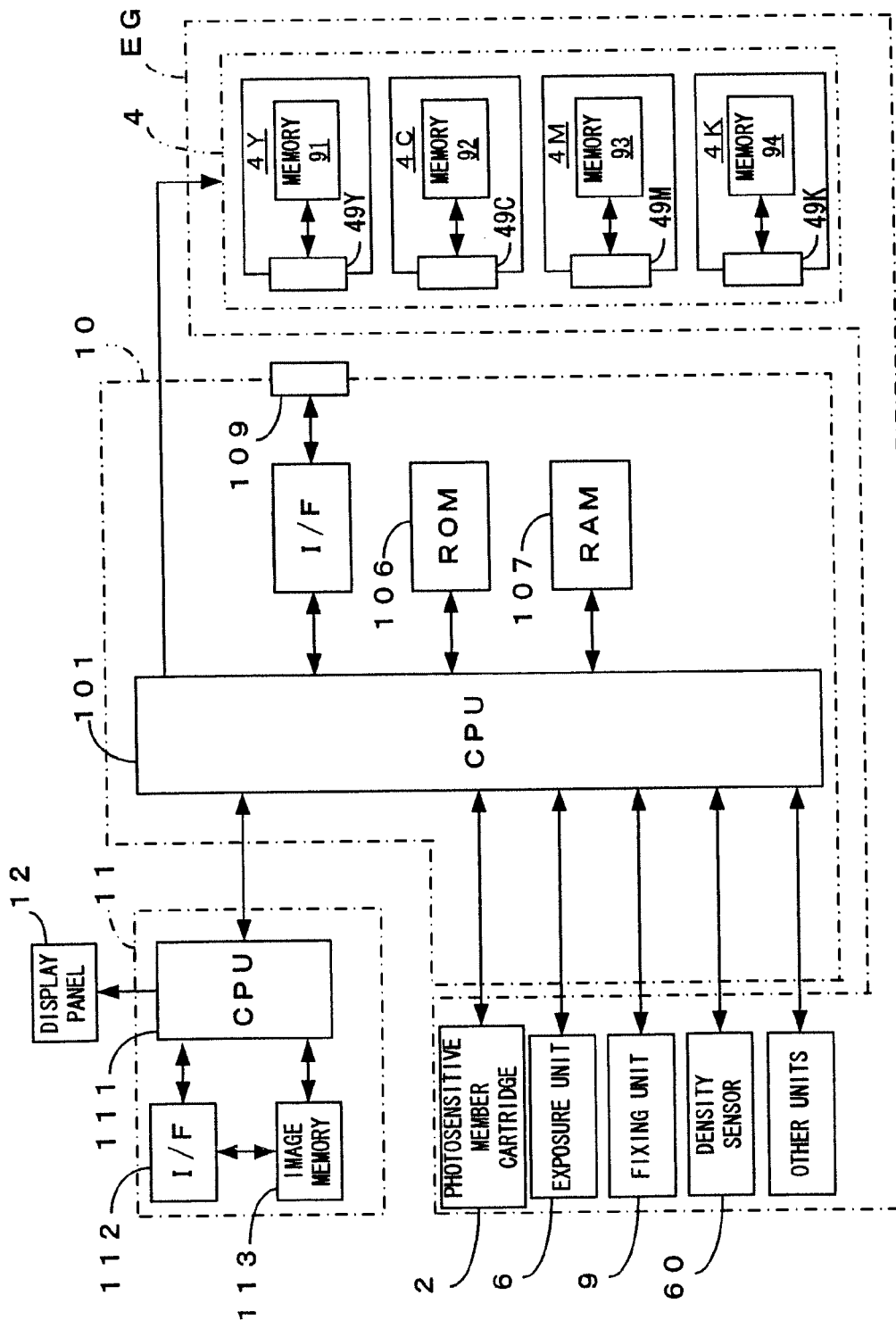
FIG. 2 is a block diagram of the electric structure of the image forming apparatus which is shown in FIG. 1.

FIG. 1 is a drawing which shows the structure of an image forming apparatus according to the present invention. FIG. 2 is a block diagram of the electric structure of the image forming apparatus which is shown in FIG. 1. The illustrated apparatus 1 is an apparatus which overlays toner in four colors of yellow (Y), cyan (C), magenta (M) and black (K) one atop the other and accordingly forms a full-color image, or forms a monochrome image using only black toner (K). In the image forming apparatus 1, when an image signal is fed to a main controller 11 from an external apparatus such as a host computer, a predetermined image forming operation is performed. That is, an engine controller 10 controls respective portions of an engine part EG in accordance with an instruction received from the main controller 11, and an image which corresponds to the image signal is formed on a sheet S.

In the engine part EG, a photosensitive member 22 is disposed so that the photosensitive member 22 can freely rotate in the arrow direction D1 shown in FIG. 1. Around the photosensitive member 22, a charger unit 23, a rotary developer unit 4 and a cleaner 25 are disposed in the rotation direction D1. A predetermined charging bias is applied upon the charger unit 23, whereby an outer circumferential surface of the photosensitive member 22 is charged uniformly to a predetermined surface potential. The cleaner 25 removes toner which remains adhering to the surface of the photosensitive member 22 after primary transfer, and collects the toner into a used toner tank which is disposed inside the cleaner 25. The photosensitive member 22, the charger unit 23 and the cleaner 25, integrated as one, form a photosensitive member cartridge 2. The photosensitive member cartridge 2 can be freely attached to and detached from a main section of the apparatus 1 as one integrated unit.

An exposure unit 6 emits a light beam L toward the outer circumferential surface of the photosensitive member 22 which is thus charged by the charger unit 23. The exposure unit 6 makes the light beam L expose on the photosensitive member 22 in accordance with an image signal fed from the external apparatus and forms an electrostatic latent image which corresponds to the image signal.

The developer unit 4 develops thus formed electrostatic latent image with toner. The developer unit 4 comprises a support frame 40 which is disposed for free rotations about a rotation shaft which is perpendicular to the plane of FIG. 1, and also comprises a yellow developer 4Y, a cyan developer 4C, a magenta developer 4M and a black developer 4K which house toner of the respective colors and are formed as cartridges which are freely attachable to and detachable from the support frame 40. The engine controller 10 controls the developer unit 4. The developer unit 4 is driven into rotations based on a control instruction from the engine controller 10. When the developers 4Y, 4C, 4M and 4K are selectively positioned at a predetermined developing position which abuts on the photosensitive member 22 or is away a predetermined gap from the photosensitive member 22, toner of the color corresponding to the selected developer is supplied onto the surface of the photosensitive member 22 from a developer roller 44 disposed to the selected developer which carries toner of this color and has been applied with the predetermined developing bias. As a result, the electrostatic latent image on the photosensitive member 22 is visualized in the selected toner color.

Non-volatile memories 91 through 94 which store information regarding the respective developers are disposed to the developers 4Y, 4C, 4M and 4K. As one of connectors 49Y, 49C, 49M and 49K disposed to the respective developers selected as needed is connected with a connector 109 which is disposed to the main section, a CPU 101 of the engine controller 10 and one of the memories 91 through 94 communicate with each other. In this manner, the information regarding the respective developers is transmitted to the CPU 101 and the information inside the respective memories 91 through 94 is updated and stored.

A toner image developed by the developer unit 4 in the manner above is primarily transferred onto an intermediate transfer belt 71 of a transfer unit 7 in a primary transfer region TR1. The transfer unit 7 comprises the intermediate transfer belt 71 which runs across a plurality of rollers 72 through 75, and a driver (not shown) which drives a roller 73 into rotations to thereby rotate the intermediate transfer belt 71 along a predetermined rotation direction D2. For transfer of a color image on the sheet S, toner images in the respective colors on the photosensitive member 22 are superposed one atop the other on the intermediate transfer belt 71, thereby forming a color image. Further, on the sheet S unloaded from a cassette 8 one at a time and transported to a secondary transfer region TR2 along a transportation path F, the color image is secondarily transferred.

At this stage, for the purpose of correctly transferring the image held by the intermediate transfer belt 71 onto the sheet S at a predetermined position, the timing of feeding the sheet S into the secondary transfer region TR2 is managed. To be more specific, there is a gate roller 81 disposed in front of the secondary transfer region TR2 on the transportation path F. As the gate roller 81 rotates in synchronization to the timing of rotations of the intermediate transfer belt 71, the sheet S is fed into the secondary transfer region TR2 at predetermined timing.

Further, the sheet S now bearing the color image is transported to a discharge tray 89, which is disposed to a top surface of the main section of the apparatus, through a fixing unit 9, a pre-discharge roller 82 and a discharge roller 83. Meanwhile, when images are to be formed on the both surfaces of the sheet S, the discharge roller 83 starts rotating in the reverse direction upon arrival of the rear end of the sheet S, which carries the image on its one surface as described above, at a reversing position PR located behind the pre-discharge roller 82, thereby transporting the sheet S in the arrow direction D3 along a reverse transportation path FR. While the sheet S is returned back to the transportation path F again before arriving at the gate roller 81, the surface of the sheet S which abuts on the intermediate transfer belt 71 in the secondary transfer region TR2 and is to receive a transferred image is at this stage opposite to the surface which already bears the image. In this fashion, it is possible to form images on the both surfaces of the sheet S.

Further, there are a density sensor 60 and a cleaner 76 in the vicinity of the roller 75. The density sensor 60 optically detects a toner amount which constitutes a toner image which is formed as a patch image on the intermediate transfer belt 71 when needed. The density sensor 60 irradiates light toward the patch image, receives reflection light from the patch image, and outputs a signal corresponding to a reflection light amount.

The cleaner 76 can be attached to and detached from the intermediate transfer belt 71. When abutting on the intermediate transfer belt 71 as needed, the cleaner 76 scrapes off the toner remaining on the intermediate transfer belt 71 and the toner which constitutes the patch image.

Further, as shown in FIG. 2, the apparatus 1 comprises a display 12 which is controlled by a CPU 111 of the main controller 11. The display 12 is formed by a liquid crystal display for instance, and shows predetermined messages which are indicative of operation guidance for a user, a progress in the image forming operation, abnormality in the apparatus, the timing of exchanging any one of the units, etc.

In FIG. 2, denoted at 113 is an image memory which is disposed to the main controller 11, so as to store an image which is fed from an external apparatus such as a host computer via an interface 112. Denoted at 106 is a ROM which stores a calculation program executed by the CPU 101, control data for control of the engine part EG, etc. Denoted at 107 is a memory (RAM) which temporarily stores a calculation result derived by the CPU 101, other data, etc.

The memories 91 through 94 disposed to the developers 4Y, 4C, 4M and 4K are preferably non-volatile memories which are capable of holding data even when the power source is off or the developers are detached from the main section. As such non-volatile memories, flash memories, ferroelectric memories (FRAMs), EEPROMs or the like may be used.

Figure 3:
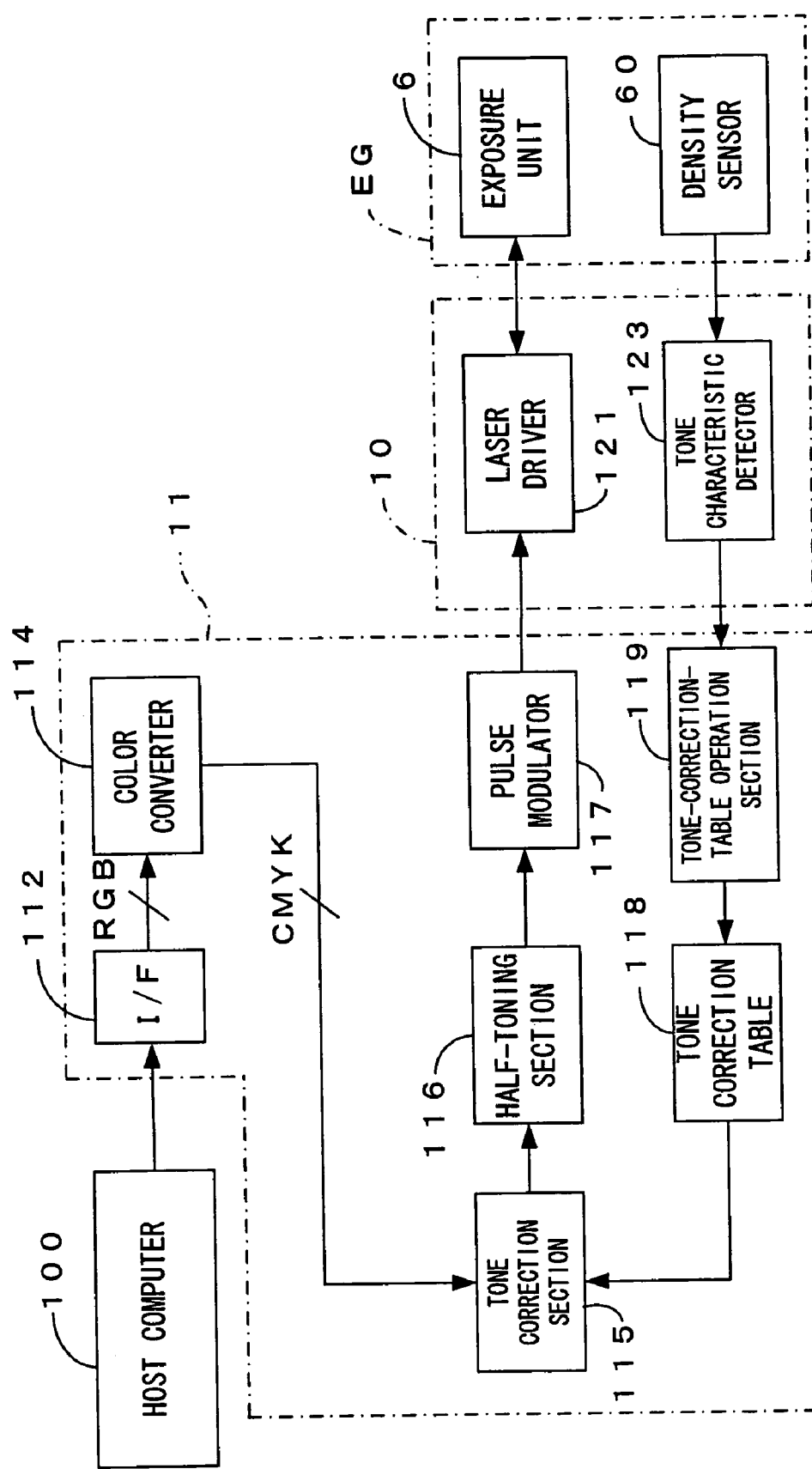
FIG. 3 is a diagram showing signal processing blocks of the apparatus.

FIG. 3 is a diagram showing signal processing blocks of the apparatus. The image forming apparatus operates as follows. When an image signal is inputted from an external apparatus such as a host computer 100, the main controller 11 performs a predetermined signal processing on the input image signal. The main controller 11 includes function blocks such as a color converter 114, a tone correction section 115, a half-toning section 116, a pulse modulator 117, a tone correction table 118, a tone-correction-table operation section 119.

In addition to the CPU 101, the ROM 106, and the RAM 107 shown in FIG. 2, the engine controller 10 further includes a laser driver 121 for driving a laser light source provided at the exposure unit 6, and a tone characteristic detector 123 for detecting a tone characteristic based on a detection result given by the density sensor 60, the tone characteristic representing a gamma characteristic of the engine EG.

In the main controller 11 and the engine controller 10, the function blocks may be implemented in hardware or otherwise, in software executed by the CPU 111, 101.

In the main controller 11 supplied with the image signal from the host computer 100, the color converter 114 converts RGB color data into CMYK color data, the RGB color data representing tone levels of RGB components of each pixel in an image corresponding to the image signal, the CMYK color data representing tone levels of CMYK components corresponding to the RGB components. In the color converter 114, the input RGB color data comprise 8 bits per color component for each pixel (or representing 256 tone levels), for example, whereas the output CMYK color data similarly comprise 8 bits per color component for each pixel (or representing 256 tone levels). The CMYK tone data outputted from the color converter 114 are inputted to the tone correction section 115.

The tone correction section 115 performs tone correction on the per-pixel CMYK data inputted from the color converter 114. Specifically, the tone correction section 115 refers to the tone correction table 118 previously stored in the non-volatile memory, and converts the per-pixel CMYK data inputted from the color converter 114 into corrected CMYK data according to the tone correction table 118, the corrected CMYK data representing corrected tone levels. An object of the tone correction is to compensate for the variations of the gamma characteristic of the engine EG constructed as described above, thereby allowing the image forming apparatus to maintain the overall gamma characteristic thereof in an idealistic state at all times.

The corrected CMYK tone data thus obtained are inputted to the half-toning section 116. The half-toning section 116 performs a half-toning process, such as an error diffusion process, a dithering process or a screening process, and then supplies the pulse modulator 117 with the half-toned CMYK tone data comprising 8 bits per color component for each pixel. The content of the half-toning process varies depending upon the type of an image to be formed. A process of the most suited content for the image is selected based on judgment standards according to which the subject image is classified as any one of a monochromatic image, a color image, a line drawing and a graphic image. Then, the selected process is executed.

The half-toned CMYK tone data inputted to the pulse modulator 117 are represented by a multivalued signal which indicates respective sizes and arrays of CMYK toner dots, to which CMYK color toners are made to adhere and which constitute one pixel. Based on such half-toned CMYK tone data thus received, the pulse modulator 117 generates a video signal for pulse width modulation of an exposure laser pulse for forming each of CMYK color images, the exposure laser provided at the engine EG. Then, the resultant signal is outputted to the engine controller 10 via a video interface not shown. In response to the video signal, the laser driver 121 provides ON/OFF control of a semiconductor laser of the exposure unit 6 whereby an electrostatic latent image of each of the color components is formed on the photosensitive member 22. The image corresponding to the image signal is formed in this manner.

In the image forming apparatuses of this type, the gamma characteristic varies from apparatus to apparatus. Furthermore, the apparatus per se encounters the variations of the gamma characteristic thereof according to the use conditions thereof. In order to eliminate the influences of the varied gamma characteristics on the image quality, a tone control process is performed in a predetermined timing so as to update the contents of the tone correction table 118 based on measurement results of image density.

The tone control process is performed as follows. Toned patch images for tone correction, prepared for measurement of the gamma characteristic, are formed on the intermediate transfer belt 71 by means of the engine EG. A density of each of the toned patch images is detected by the density sensor 60. Based on signals from the density sensor 60, the tone characteristic detector 123 generates a tone characteristic (the gamma characteristic of the engine EG) which relate the individual tone levels of the toned patch images with the detected image densities. The resultant tone characteristic is outputted to the tone-correction table operation section 119 of the main controller 11. The tone-correction table operation section 119, in turn, operates tone correction table data based on the tone characteristic supplied from the tone characteristic detector 123. The tone correction table data are used for compensating for the measured tone characteristic of the engine EG in order to obtain an idealistic tone characteristic. Then, the tone-correction table operation section 119 updates the tone correction table 118 to the operation results. The tone correction table 118 is re-defined in this manner. Thus, the image forming apparatus is allowed to form images of a consistent quality regardless of the variations of the gamma characteristic thereof or the time-related variations thereof.

Now, a section-by-section description will be made on the toner counting techniques according to the first to fourth embodiments of the invention which are applicable to the image forming apparatus of the aforementioned construction. It is noted that both a dot counter and a toner counter, which will be described hereinafter, may be implemented in hardware employing a gate array and discrete devices, or in software executed by a CPU or a dedicated processor or otherwise, have an arrangement combining the above two arrangements.

2-1 Basic Principles of the Embodiments

Figure 4:
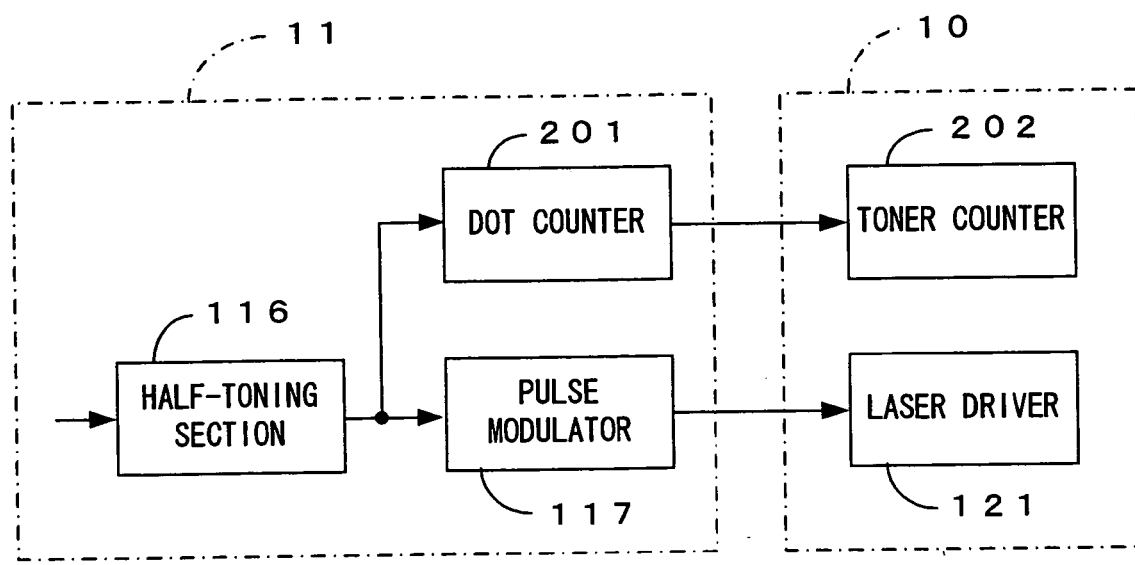
FIG. 4 is a block diagram showing a toner counter according to the first to fourth embodiments.

FIG. 4 is a block diagram showing a toner counter according to the first to fourth embodiments. In the image forming apparatuses of this type, it has been a conventional practice to integrate toner consumption per toner dot to be formed thereby determining the amount of toner consumed for forming the whole image or consumed in the overall image forming apparatus. The toner consumption per toner dot is substantially proportional to exposure time using the exposure beam L. Therefore, the toner consumption may be determined by detecting and integrating irradiation time of the exposure beam L, or by integrating a multivalued signal relating to the toner dot to be formed. For instance, the pulse width of a modulation signal for controlling the light source or the values of the tone data for pulse modulation may be integrated. It is not easy to directly detect the irradiation time of the exposure light source. It is more practicable to integrate the values of the multivalued signal corresponding to the irradiation times.

According to the first to fourth embodiments of the image forming apparatuses, a dot counter 201 integrates the values of the half-toned CMYK data inputted to the pulse modulator 117, whereas a toner counter 202 calculates the toner consumption based on the integration value accumulated by the dot counter 201.

The image forming apparatus of this type is varied in the characteristics thereof. Despite the variations of the characteristics thereof, the apparatus assures consistent densities of images finally formed on the sheets S. This is because the operating conditions of the apparatus and the contents of signal processes are adjusted in a manner to prevent the varied characteristics of the apparatus from affecting the image density. Since the operating conditions of the apparatus or the contents of the signal processes are varied, the toner consumption may vary from apparatus to apparatus even though the same image signal is applied thereto. In addition, the toner consumption may also vary in one apparatus depending upon the operating conditions thereof. For instance, the toner consumption is varied in conjunction with the variations of the gamma characteristic of the apparatus.

Figure 5:
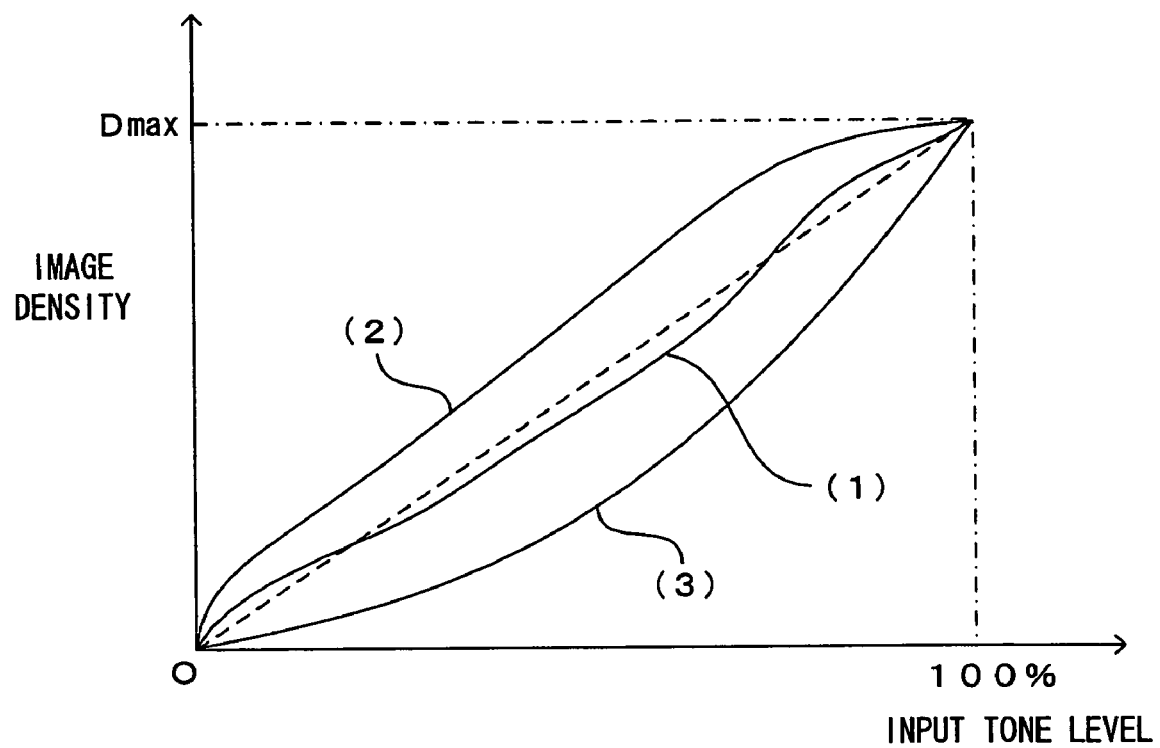
FIG. 5 is a graph showing an exemplary gamma characteristic of the apparatus.

FIG. 5 is a graph showing an exemplary gamma characteristic of the apparatus. For faithful image formation to the input image signals, it is desirable, as indicated by a characteristic curve (1) in FIG. 5, that actual image densities are varied as much linearly related as possible with input tone levels defined by original image signals (the tone levels of the data supplied from the color converter 114 to the tone correction section 115). The actual apparatus, however, presents an upwardly protruded curve as indicated by a characteristic curve (2) or conversely downwardly protruded curve as indicated by a characteristic curve (3) in the figure. When supplied with the same image signals, an apparatus having the characteristic indicated by the characteristic curve (2) forms images of higher densities than those formed by apparatuses having different characteristics. Accordingly, the former apparatus consumes more toner than the latter apparatuses. On the other hand, an apparatus having the characteristic indicated by the characteristic curve (3) forms images of lower densities than those formed by apparatuses having different characteristics. Accordingly, the former apparatus consumes less toner than the latter.

Even if the dot counter 201 gives the same cumulative value of the tone data, the toner consumption at each job may vary because of the varied gamma characteristic of the apparatus. This dictates the need for the toner counter 202 to correct the cumulative value in consideration of the influences of the varied gamma characteristic of the apparatus, before determining the toner consumption from the above cumulative value.

As mentioned supra, the apparatus performs the tone correction on the input image signal, thus reducing the variations of the image density resulting from the varied gamma characteristic thereof. That is, the tone correction section 115 corrects the tone data to lower the values thereof and outputs the corrected tone data to an apparatus having the characteristic represented by the characteristic curve (2) and tending to form images of higher, densities. On the other hand, the tone correction section 115 corrects the tone data to increase the values thereof and outputs the corrected tone data to an apparatus having the characteristic represented by the characteristic curve (3) and tending to form images of lower densities. In this manner, the tone correction section prevents the varied gamma characteristic from affecting the image density. This allows the apparatus to assure a substantially constant amount of toner consumed for forming images corresponding to the same image signal, regardless of the inconsistent nature inherent to the apparatus or the varied use conditions.

In this case, however, the dot counter 201 does not always give the same cumulative value in correspondence to the same input image signal. This is because even though the same image signal is inputted, the values of the tone data to be integrated are not always the same but are corrected according to the varied gamma characteristic of the apparatus, as described above. If the toner consumption is calculated using an uncorrected integration value, the calculation result may differ from an actual toner consumption.

In the image forming apparatuses having inconsistent characteristics or individually varied in the characteristic thereof according to the use conditions, the high-accuracy determination of the toner consumption-from the integration value of the tone data dictates the need for performing the correction according to the characteristic of the apparatus regardless of whether the tone correction is performed or not. This also holds for a calculation method wherein, for example, the pulse width of the pulse modulation signal or the irradiation time of the exposure light source is integrated. While a substantially proportional relation exists between the irradiation time of the exposure light source and the toner consumption, for example, a proportionality constant of the relation varies corresponding to the varied characteristic of the individual apparatuses or the varied characteristic associated with the use conditions of the apparatus. In order to accurately determine the toner consumption from the integration value of the irradiation time, therefore, correction need be made in correspondence to the varied characteristic of the apparatus. Specifically, the toner counter 202 corrects the integration value in the following manner such as to calculate the toner consumption using the corrected value.

Figure 6:
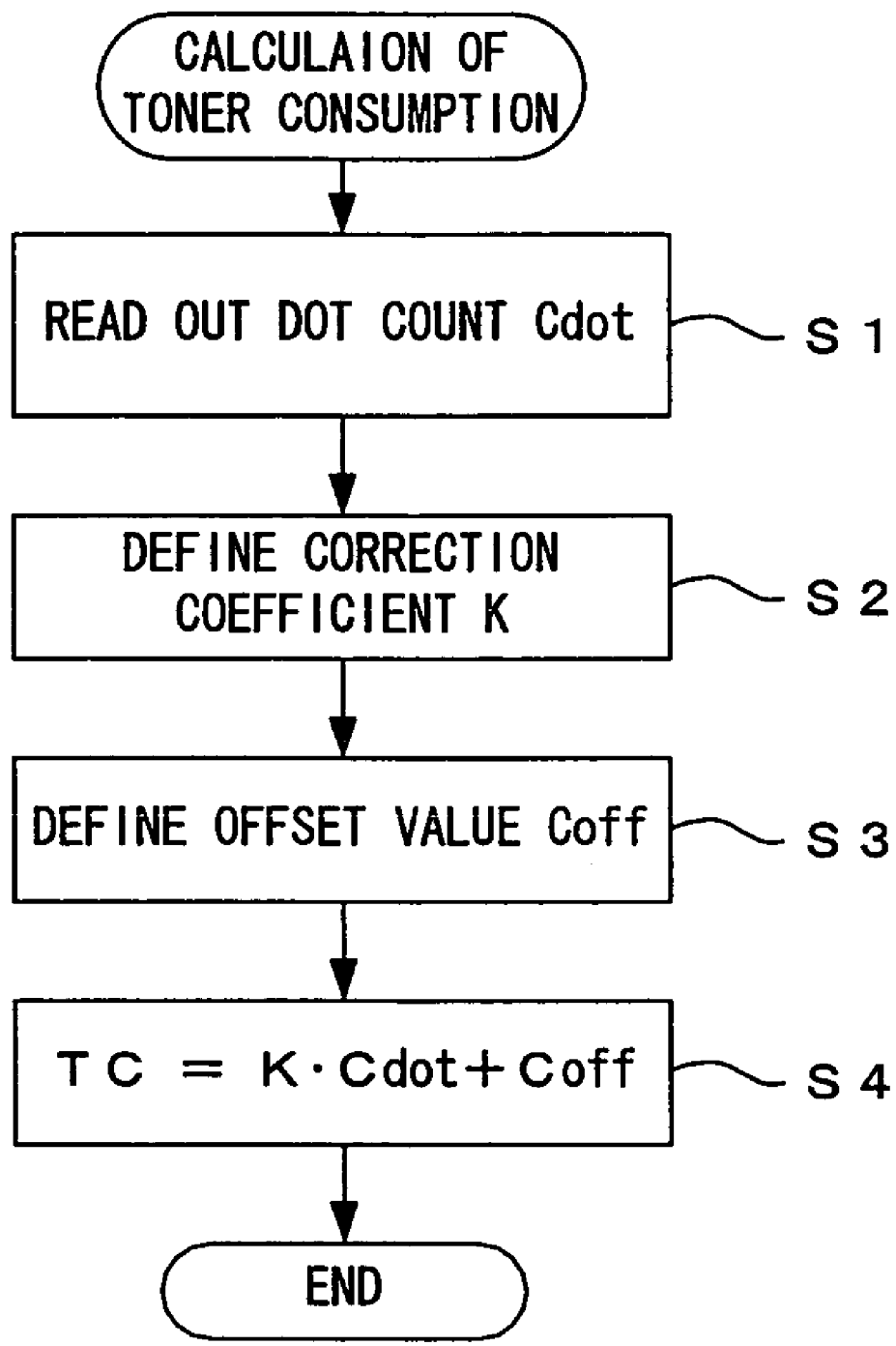
FIG. 6 is a flow chart representing the steps of a toner consumption calculation process performed by the toner counter.

FIG. 6 is a flow chart representing the steps of a toner consumption calculation process performed by the toner counter. As required, the toner counter 202 performs the process shown in FIG. 6 for each set of a predetermined number of formed images, or in a predetermined timing such as on a per-job basis or a per-day basis. Thus, the toner counter calculates the amount of toner consumed during the process. First, the toner counter 202 reads out a dot count Cdot in the process from the dot counter 201, or an integration value of the values of the half-toned CMYK tone data outputted from the half-toning section 116 (Step S1). Next, the toner counter defines a correction coefficient K according to the gamma characteristic of the apparatus (Step S2). The correction coefficient K is a proportionality constant of the relation between the dot count Cdot and the toner consumption, or a numerical value equivalent to a toner consumption corresponding to 1 dot count. However, the value of the correction coefficient varies depending upon the gamma characteristic of the apparatus. How to define the correction coefficient K will be specifically described in the description of the embodiments to be made hereinlater.

Subsequently, the toner counter 202 defines an offset value Coff according to the use conditions of the apparatus (Step S3). The offset value is a value equivalent to an amount of toner consumed in a manner not to contribute to the formation of an image corresponding to an input image signal. Such a toner is exemplified by toner liberated from the developing roller 44 so as to be adhered to the photosensitive member 22 to produce fogging or to be scattered in the apparatus, toner consumed by the apparatus during a control operation for maintaining the performance of the apparatus, and such. The amount of toner consumed in this manner is correlated with the length of operation time of the apparatus, the number of formed images, the operating conditions of the apparatus or the like. Hence, the amount of toner consumed during a period of interest is estimated from such information pieces managed by the engine controller 10 and the resultant estimation is used as the offset value Coff.

Then, the total amount TC of toner consumption during the period of interest is calculated using these values (Step S4). That is, the toner consumption TC is calculated using the following equation:

$$TC = K \cdot Cdot + Coff \quad \text{(equation 1)}$$

The toner consumption thus determined is managed by the CPU 101 provided at the engine controller 10 and is stored in the RAM 107 or the memory 91 or the like of the developer 4Y or the like, on an as-required basis. It is also possible to estimate a residual quantity of toner in each of the developers based on the value of the toner consumption thus determined. The residual quantity of toner thus determined may be advantageously used for managing a consumable article of the apparatus in a manner, for example, to direct the display section 12 to display a message prompting a user to replace the used developer with a new one when it is determined that the residual quantity of toner in the developer is decreased to below a predetermined level.

Next, description is made on how to define the correction coefficient K in Step S2. The apparatus is adapted to determine the toner consumption with high accuracies irrespective of the variations of the gamma characteristic of the apparatus by re-defining the correction coefficient K in the predetermined timing. The timing may be, for example, time immediately after the activation of the apparatus, or time when the number of formed images reaches a predetermined value. There are a variety of ideas as to what parameter is used to express the gamma characteristic of the apparatus. Accordingly, there may be contemplated a variety of methods to define the correction coefficient K. As typical examples, four embodiments individually adopting different methods to define the correction coefficient K are described in turn.

2-2. First Embodiment

The first embodiment defines the correction coefficient K in consideration of the varied characteristic of the toner charged in the developer, the toner characteristic representing one of the parameters affecting the gamma characteristic of the apparatus. The image forming apparatus is constructed such that each of the developers 4Y and the like is removably attachable to the apparatus body. At toner end, the toner is replenished by replacing the developer with a new one. Since the characteristic of the toner varies slightly depending upon the production lot, the gamma characteristic of the apparatus as a whole is varied by the developer so loaded.

The embodiment particularly focuses attention to the amount of electric charge per unit mass of the toner. The amount of toner charge may be varied depending upon the variations of toner compositions or the size variations of components of the developer, or may be varied with time in conjunction with the deterioration of the toner. In the image forming apparatus, each of the developers includes the memory for storing information on the developer of interest. Therefore, the CPU 101 accessible to the memory is capable of estimating the amount of toner charge from the information stored in the memory, the information including, for example, the residual quantity of toner in the developer of interest, the number of printed sheets, the toner color, the production lot and the like. Thus, the toner counter 202 defines the correction coefficient K according to the magnitude of the amount of toner charge thus estimated.

Figure 8:
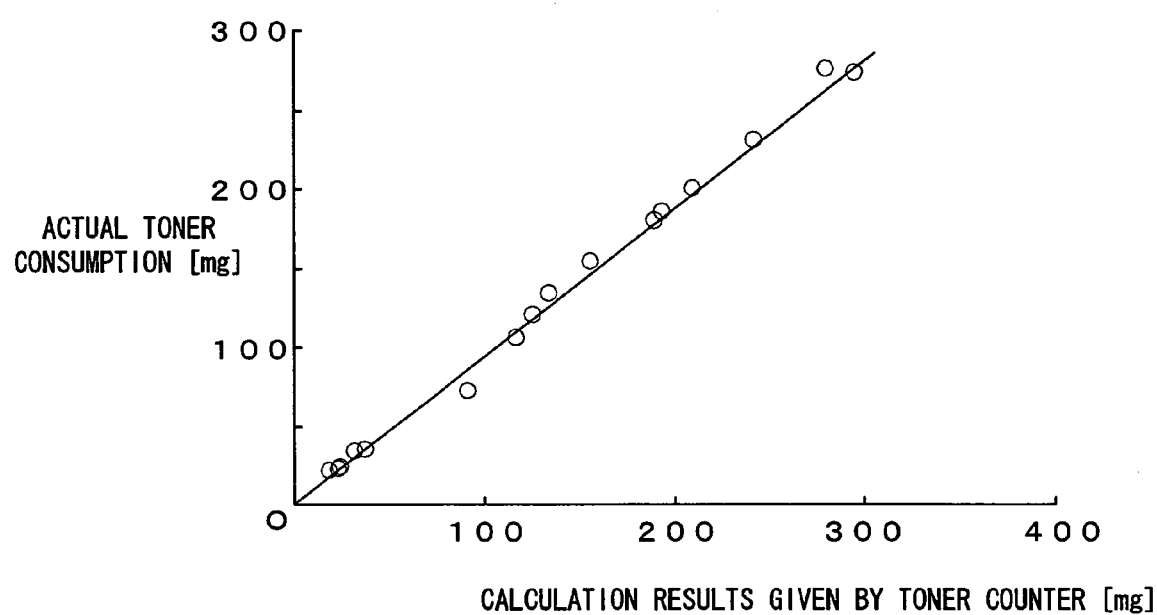
FIG. 8 is a graph showing the calculation results of toner consumption according to this embodiment.

FIG. 7 is a chart showing set values of the correction coefficient according to the first embodiment. FIG. 8 is a graph showing the calculation results of toner consumption according to this embodiment. Based on the information retrieved from the RAM 107 and the memory 91 or the like of the individual developers, the CPU 101 classifies the developer of interest into any of the three ranks which include: Rank 1 (a large amount of toner charge per unit mass); Rank 2 (a medium amount of toner charge per unit mass); and Rank 3 (a small amount of toner charge per unit mass). The toner counter 202 selects one of the three optional correction coefficients shown in FIG. 7, previously defined, based on the ranking information and calculates the toner consumption using the selected value as the present correction coefficient K.

The image forming apparatus including the toner counter 202 defining the correction coefficient K in this manner was operated to form images under various conditions. Subsequently, the toner consumptions calculated by the toner counter 202 were compared with measurement values. As shown in FIG. 8, a definite correlation (correlation coefficient $R^2=0.9954$) was observed between these values. It was thus confirmed that this method provides the high-accuracy determination of the toner consumption.

2-3. Second Embodiment

The second embodiment defines the correction coefficient K according to the degree of deterioration of the photosensitive member 22. With a new photosensitive member 22 which is not decreased in thickness, the apparatus forms images having relatively high densities. However, as the number of time of use increases, the photosensitive member is progressively worn out so that the performance thereof is deteriorated accordingly. Consequently, the formed images are progressively decreased in density. In an apparatus loaded with a new photosensitive member, therefore, the gamma characteristic curve thereof tends to protrude upwardly as indicated by the curve (2) shown in FIG. 5. In an apparatus with a used photosensitive member, which is heavily worn, on the other hand, the gamma characteristic curve thereof tends to protrude downwardly as indicated by the curve (3) shown in FIG. 5. In view of this, the correction coefficient K may be defined according to the degree of deterioration of the photosensitive member, thereby increasing the accuracy of the calculation of toner consumption.

Figure 9:
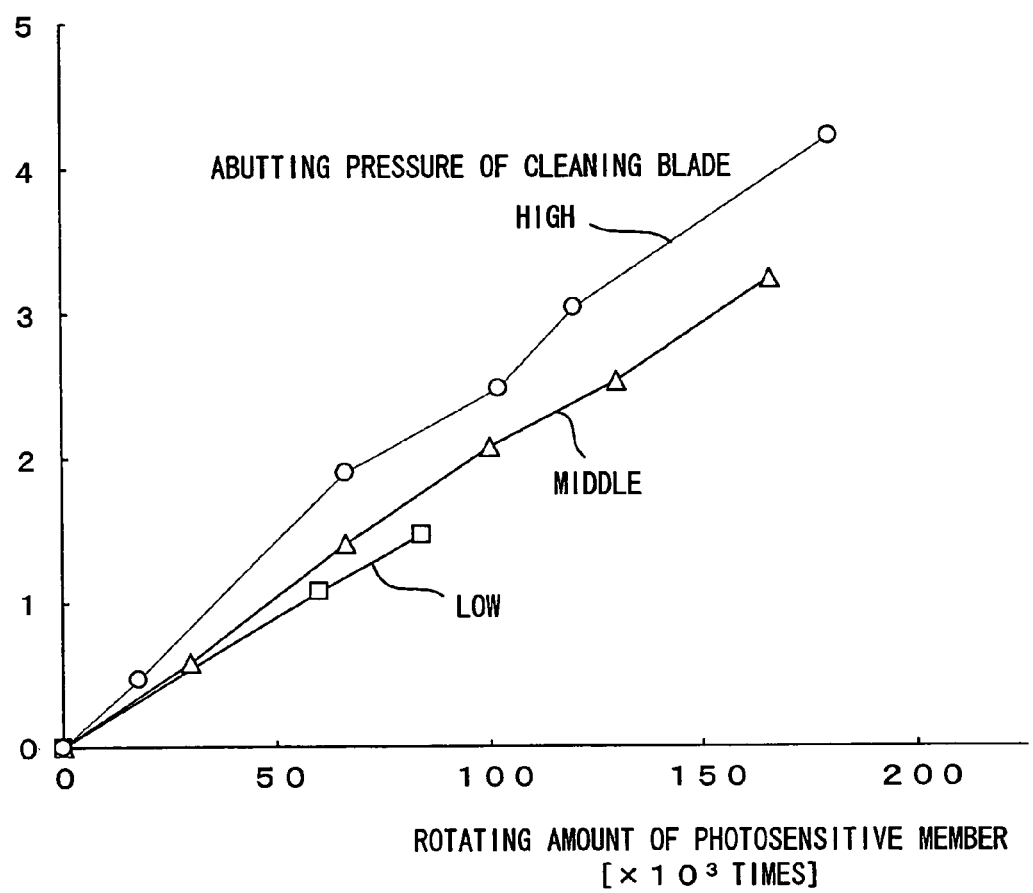
FIG. 9 is a graph showing an example of time-related variations of the thickness of the photosensitive member.
Figure 10:
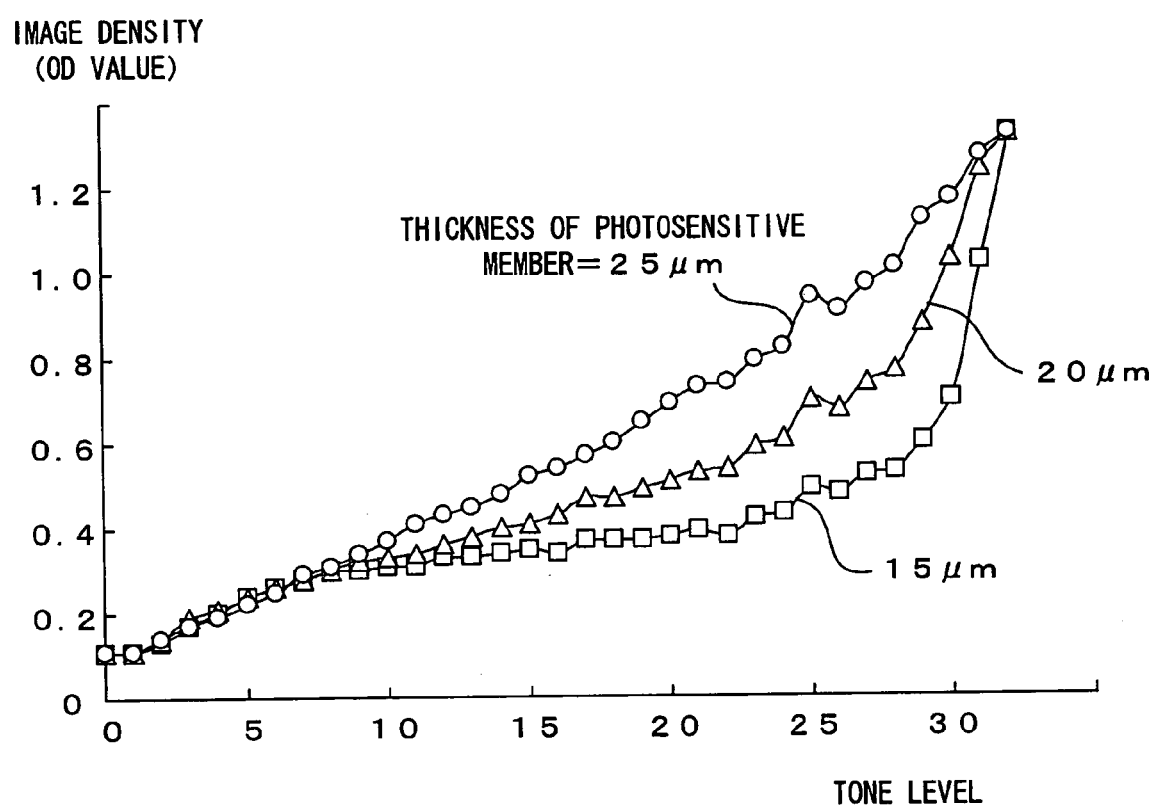
FIG. 10 is a graph showing a relation between the thickness of the photosensitive member and the gamma characteristic.

FIG. 9 is a graph showing an example of time-related variations of the thickness of the photosensitive member. FIG. 10 is a graph showing a relation between the thickness of the photosensitive member and the gamma characteristic. The intermediate transfer belt 71 and a cleaning blade for removing the residual toner are pressed against the surface of the photosensitive member 22. As shown in FIG. 9, therefore, the photosensitive member 22 is gradually worn to be decreased in thickness while the photosensitive member keeps rotating. As varied in thickness, the photosensitive member 22 is varied in the characteristics thereof, so that the gamma characteristic of the apparatus as a whole is also varied. The test conducted by the present inventors revealed a tendency, as shown in FIG. 10, that the greater the thickness of the photosensitive member 22, the higher the density of the half-toned image.

The photosensitive member cartridge 2 is not provided with a memory. However, the deterioration of the photosensitive member 22 proceeds in correspondence to the length of use time. Therefore, it is possible to figure out the degree of deterioration of the photosensitive member by some measures so long as the time when the apparatus was loaded with a new photosensitive member and the length of time of use of the photosensitive member are known. For instance, the following provision may be made to indicate that a new photosensitive member 22 is loaded in the apparatus. The photosensitive member cartridge 2 is provided with a fuse, which is designed to blow when the cartridge is loaded in the apparatus for the first time. Thus, the loading of a new photosensitive member can be determined by detecting a current flow through the fuse. On the other hand, the CPU 101 can figure out the length of time of use of the photosensitive member 22 by utilizing information such as the number of images formed by using the photosensitive member 22 of interest or the length of operation time of the apparatus.

FIG. 11 is a chart showing set values of the correction coefficient according the second embodiment. As mentioned supra, while the photosensitive member is at the initial stage of life, the formed images are high in the density. As the photosensitive member becomes older, on the other hand, the formed images are lowered in density. Hence, the embodiment defines the correction coefficient K to be a great value in a case where the apparatus loaded with a new photosensitive member cartridge has formed a small number of images or where the loaded photosensitive member is at a rather initial stage of life. However, the embodiment defines the correction coefficient K to be a progressively decreased value in correspondence to the increased length of use time of the photosensitive member. Although the measurement results are not shown, the embodiment thus arranged achieved a good agreement between the calculated toner consumptions and the measured values just as the first embodiment.

The thickness of the photosensitive member 22 is not only varied with time or due to wear, but may also be varied by reason of the production tolerances. With this in view, the following approach may be taken. A piece of information relating to the thickness of a photosensitive member as measured at production site is stored in a photosensitive member cartridge 2. When the photosensitive member cartridge is loaded in the apparatus, the apparatus retrieves this information piece, so as to use the information for defining the correction coefficient K. The correction coefficient K may be defined in a manner, for example, that the correction coefficient K has the higher value in correspondence to the greater value of the factory-measured thickness of the photosensitive member 22, but that the correction coefficient K has the lower value in correspondence to the smaller value of the factory-measured thickness. Furthermore, the value thus defined may be used as an initial value of the correction coefficient K, which may properly be changed according to the use conditions of the photosensitive member 22.

2-4. Third Embodiment

The third embodiment defines the correction coefficient K based on a respective set value of some of the parameters defining the operating conditions of the apparatus, the some parameters designed to be varied in order to adjust the image density. The image forming apparatus 1 of the invention is adapted to vary the power of the light beam L irradiated from the exposure unit 6 onto the photosensitive member 22 (hereinafter, simply referred to as "exposure power") and the potential of the developing bias applied to the developing roller 44. The apparatus adjusts the image density by properly changing these parameters. More specifically, a high-density image, such as a solid image, is formed as a patch image for each toner color. The developing bias is so adjusted as to allow the patch image to achieve a predetermined target density. In addition, a low-density image (such as a thin line image based on 1-on 10-off light irradiation) is formed as a patch image. The exposure power is so adjusted as to allow the patch image to achieve a predetermined target density. There are known a large number of techniques concerning such an adjustment method and hence, the description thereof is omitted herein.

By adjusting the operating conditions in this manner, the apparatus is adapted to ensure substantially constant image densities of images formed at tone levels in regions of about 0% and of about 100% (FIG. 5), no matter how the operating circumstances of the apparatus or the ambience around the apparatus may vary. However, the apparatus does not always provide a constant density of images having an intermediate tone level, as will de described hereinlater. Such half-toned images are somewhat varied in density depending upon the set values of the aforesaid parameters.

Figure 13:
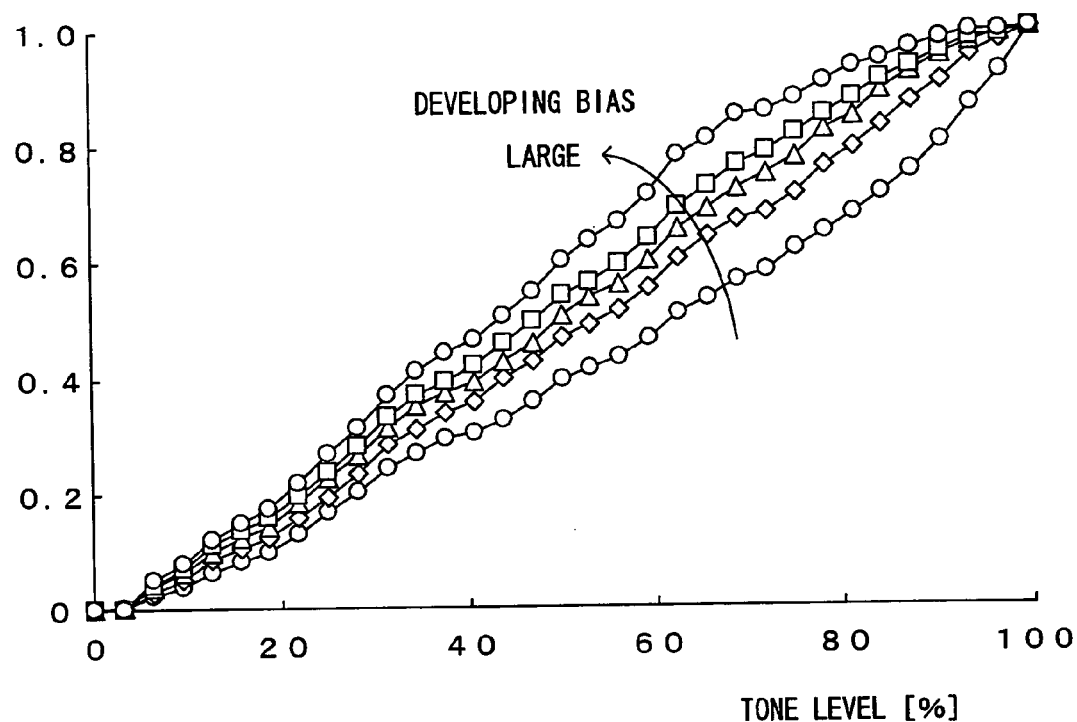
FIG. 13 is a graph showing an exemplary relation between the developing bias potential and the gamma characteristic.

FIG. 12 is a graph showing an exemplary relation between the exposure power and the gamma characteristic. FIG. 13 is a graph showing an exemplary relation between the developing bias potential and the gamma characteristic. More specifically, FIG. 12 illustrates how measured gamma characteristic is varied depending upon the set value of the exposure power of the apparatus, the operating conditions of which are adjusted in the aforementioned manner. Likewise, FIG. 13 illustrates how the measured gamma characteristic is varied depending upon the set value of the developing bias. As shown in FIG. 12 and FIG. 13, the adjustment of the operating conditions provides substantially constant image densities in the regions of low tone level and high tone level. However, the images at the intermediate tone level have densities slightly varied depending upon the set value of the parameters.

Specifically, the greater exposure power leads to the higher density of the image having the intermediate tone level. In other words, in a case where the exposure power is set to a relatively high value, a greater amount of toner is likely to be consumed than in cases where the exposure power is not at the high value. Furthermore, the image density becomes higher as the developing bias potential increases (or is increased in the difference from the surface potential of the photosensitive member). This also results in the increase of toner consumption. In a case where the parameters defining the operating conditions of the apparatus are set to such values as to result in the relatively high density of the image having the intermediate tone level, it is preferred to define the correction coefficient K of the (equation 1) to be a higher value than in the other cases. Although the measurement-results are not shown, this approach determines the toner consumption more accurately than the case where the correction coefficient K is defined at a fixed value regardless of the set values of the parameters.

While this apparatus sets the charging bias potential to a fixed value, there is known an apparatus which is adapted to adjust the image density by varying the potential of the charging bias applied to the charger unit 23 for electrically charging the photosensitive member 22. Such an apparatus can also achieve the increased accuracies of the toner consumption calculation by re-defining the correction coefficient K based on the set value of the charging bias.

2-5. Fourth Embodiment

According to the fourth embodiment, test patch images are practically formed to determine the densities of the patch images, which reflect the gamma characteristic of the apparatus. The correction coefficient K is defined based on the detected densities of the patch images. As mentioned supra, the apparatus forms the patch images and detect the densities thereof in order to perform the tone control process for the purpose of updating the tone correction table 118 according to the actual state of the apparatus. Since the detection results of image density may also be used to define the correction coefficient K, it is not necessary to form additional patch images dedicated to the definition of the correction coefficient K.

Figure 14:
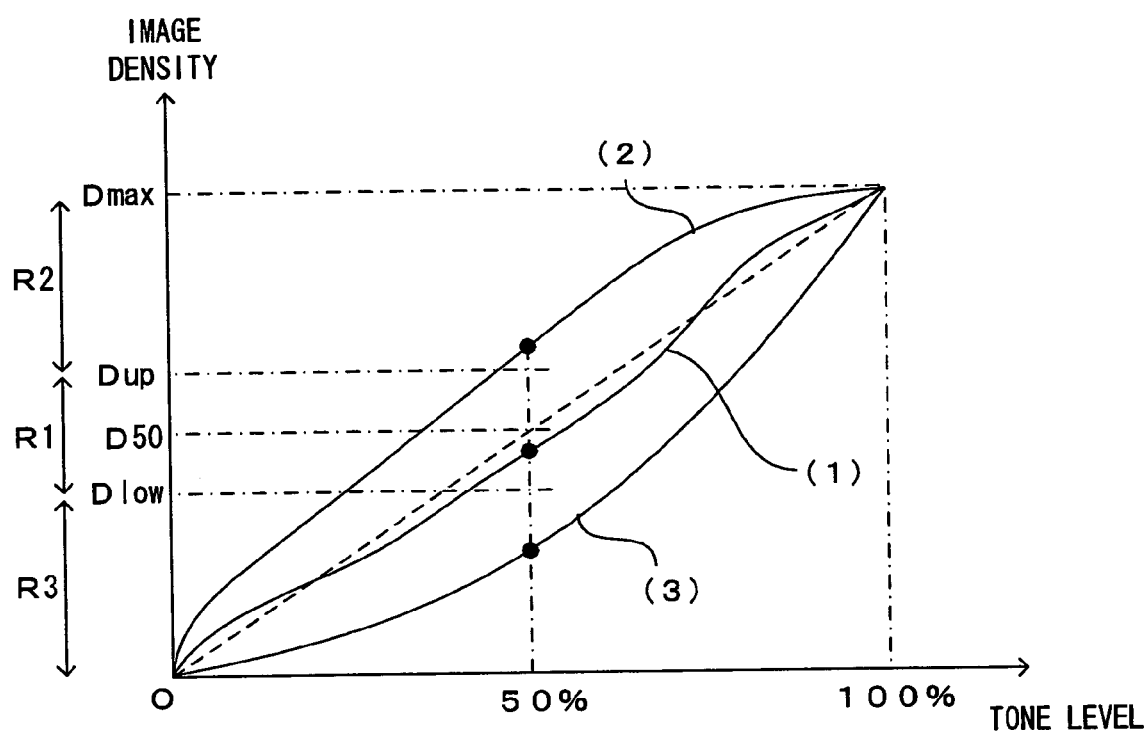
FIG. 14 is a graph showing the principles of the correction coefficient definition based on the densities of the patch images.

FIG. 14 is a graph showing the principles of the correction coefficient definition based on the densities of the patch images. According to the embodiment, the densities of the patch images formed at predetermined tone levels are compared with values previously defined as standard densities of such images. For instance, a density of a patch image having a tone level of 50% (at level 128 of the 256 levels) is compared with D50, a value previously defined as a standard density thereof. Based on the comparison result, determination is made as to whether the gamma characteristic of the apparatus exhibits a curve (a curve (1) shown in FIG. 14) close to an ideal curve (indicated by a broken line in FIG. 14), a curve (2) shifted to a high density side, or a curve (3) shifted to a low density side. The correction coefficient K is defined according to the determination thus made.

Figure 15:
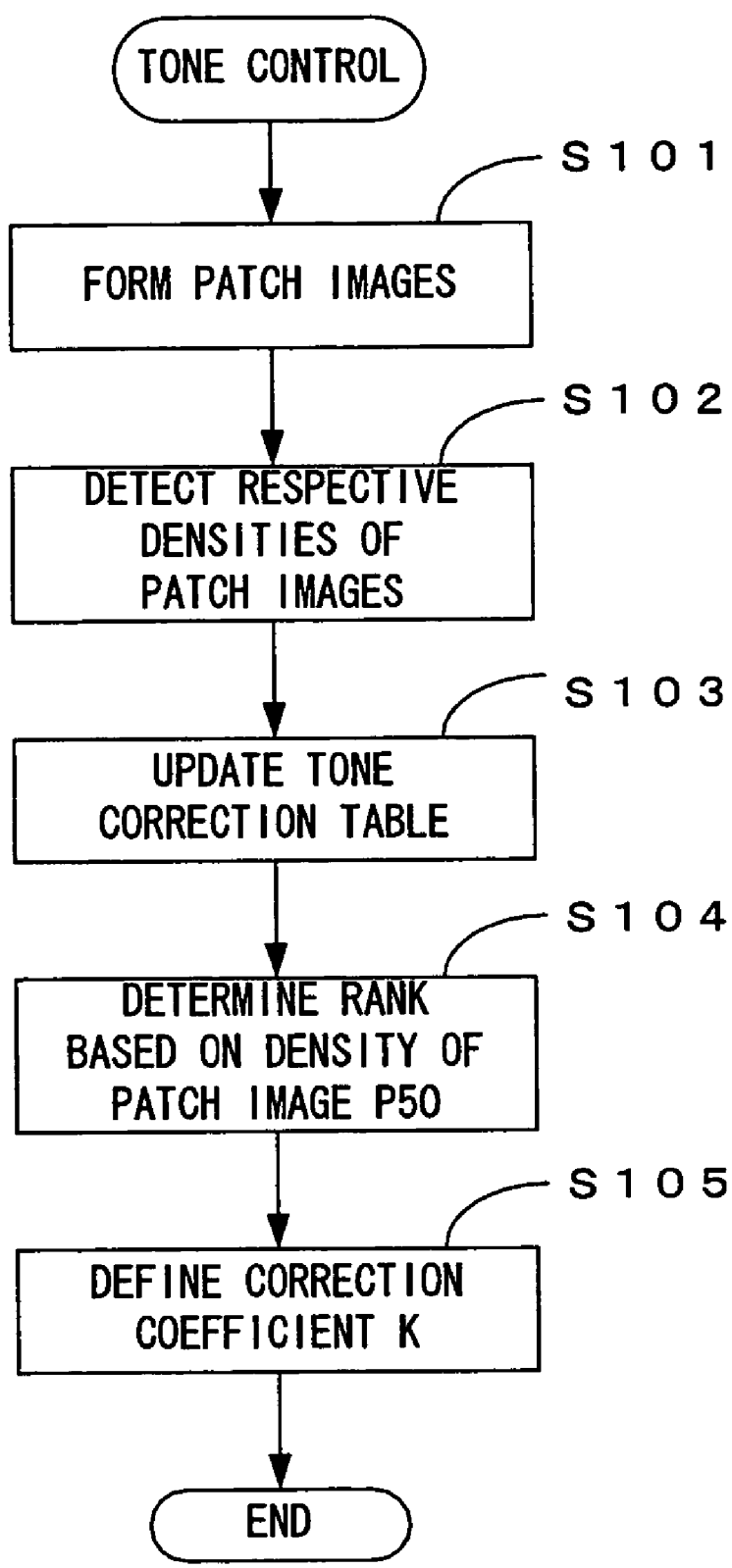
FIG. 15 is a flow chart showing the steps of the tone control process.
Figure 16:
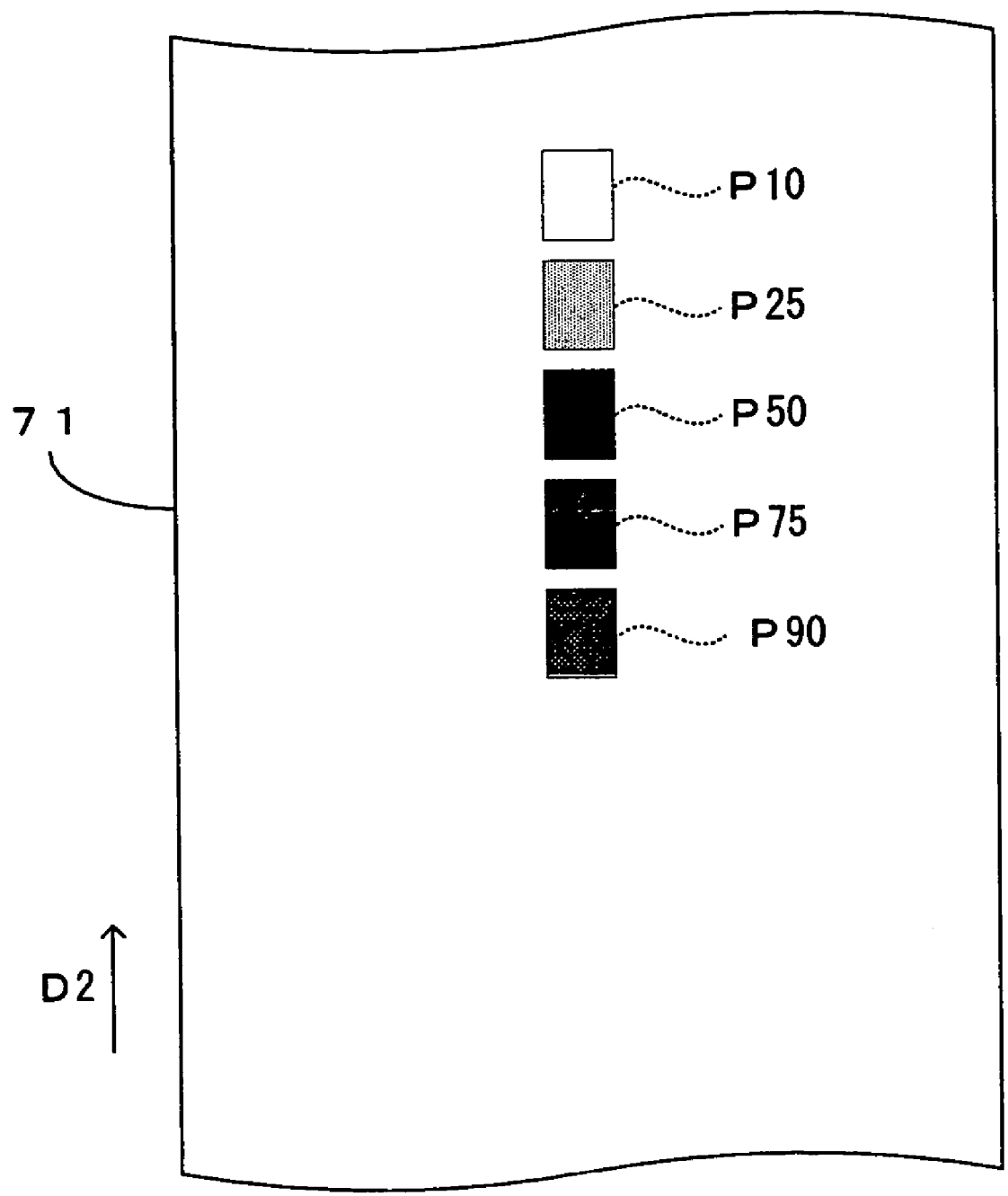
FIG. 16 is a diagram illustrating the patch images.

FIG. 15 is a flow chart showing the steps of the tone control process. FIG. 16 is a diagram illustrating the patch images. In the tone control process executed by the CPU 101 as shown in FIG. 15, a certain number of patch images individually having different tone levels are first formed (Step S101). As shown in FIG. 16, for example, a total number of five patch images P10, P25, P50, P75 and P90 having respective tone levels of 10%, 25%, 50%, 75% and 90% are formed. It is noted that the tone level of the patch image means here a level of the half-toned data outputted from the half-toning section 116 and does not mean an input tone level (a tone level of the data inputted to the color converter 114) shown in FIG. 5. This approach permits the detected densities of these patch images to reflect the gamma characteristic of the apparatus, which is not subjected to the tone correction, or to reflect a "raw" gamma characteristic of the engine EG. Therefore, the detection results may be used to update the tone correction table 118 so that a more faithful tone correction to the actual state of the apparatus may be accomplished.

Returning to FIG. 15, the explanation of the tone control process is continued. The individual densities of the patch images thus formed are detected by means of the density sensor 60 (Step S102). Then, the tone correction table 118 is re-defined based on the detected densities in a manner that the tone levels of the final image versus the input tone levels may substantially linearly vary (Step S103). This approach permits the subsequent image forming operation to provide an image faithful to an image signal irrespective of the gamma characteristic of the apparatus.

Subsequently, the apparatus is determined for its rank corresponding to the gamma characteristic thereof based on the detected density of the patch image P50 having the tone level of 50%, which is included in the aforementioned patch images (Step S104). The correction coefficient K is defined based on the rank thus determined (Step S105). A specific method of defining the correction coefficient is described referring to FIG. 14 again.

When the engine EG carries out the image forming process based on the tone data piece having the tone level of 50%, the resultant image does not necessarily have the standard density D50. Because of the influence of the gamma characteristic of the engine EG, the resultant image may have a higher or lower density than the standard density. In a case where the density of the patch image P50 is higher than the standard density D50, the apparatus has the gamma characteristic represented by the upwardly protruded curve (2) shown in FIG. 14. Accordingly, the apparatus has a tendency to form images of relatively higher densities and to consume more toner. Conversely, in a case where the density of the patch image P50 is lower than the standard density D50, the apparatus has the gamma characteristic represented by the downwardly protruded curve (3) shown in FIG. 14. Accordingly, the apparatus has a tendency to form images of relatively lower densities and to consume less toner. In the apparatus wherein the detected density of the patch image P50 is higher than the standard level, therefore, the correction coefficient K may be defined to be a greater value than that for the apparatus forming the images of lower densities, so that the toner consumption may be calculated with high accuracies and in better agreement with the actual state of the apparatus.

In short, the higher the detected density of the patch image P50, the apparatus need to have the correction coefficient K set to the greater value. Hence, the embodiment classifies the image density into any of the three ranks and defines the correction coefficient K based on which of the ranks the detected density of the patch image P50 belongs to. Specifically, the classification is made as follows. As shown in FIG. 14, an upper limit density Dup and a lower limit density Dlow of a portion of the gamma characteristic curve of the apparatus are previously determined, the portion of the characteristic curve regarded as substantially linear and having the standard density D50 of the patch image P50 positioned at the center thereof. The apparatus is ranked by comparing the detected densities with these limit values.

FIG. 17 is a chart showing set values of the correction coefficient according to the third embodiment. In a case where the detected density of the patch image P50 belongs to Rank RI between the upper limit density Dup and the lower limit density Dlow, the gamma characteristic of the engine EG is substantially linear as indicated by the characteristic curve (1) of FIG. 14. A correction coefficient K in this case is defined as 0.502. On the other hand, in a case where the detected density of the patch image P50 belongs to Rank R2 above the upper limit density Dup, the gamma characteristic of the engine EG is protruded upwardly as indicated by the characteristic curve (2) of FIG. 14. A correction coefficient K in this case is defined as 0.554, a higher value than the above. Conversely, in a case where the detected density of the patch image P50 belongs to Rank R3 below the lower limit density Dlow, the gamma characteristic of the engine EG is protruded downwardly as indicated by the characteristic curve (3) of FIG. 14. Therefore, a correction coefficient K in this case is defined as 0.451, the lowest value among the above.

It is noted that the second column of the table shown in FIG. 17 (the tone rank related to D50) illustrates a ranking method based on another concept. The fourth embodiment may also define the correction coefficient K as follows.

Figure 18:
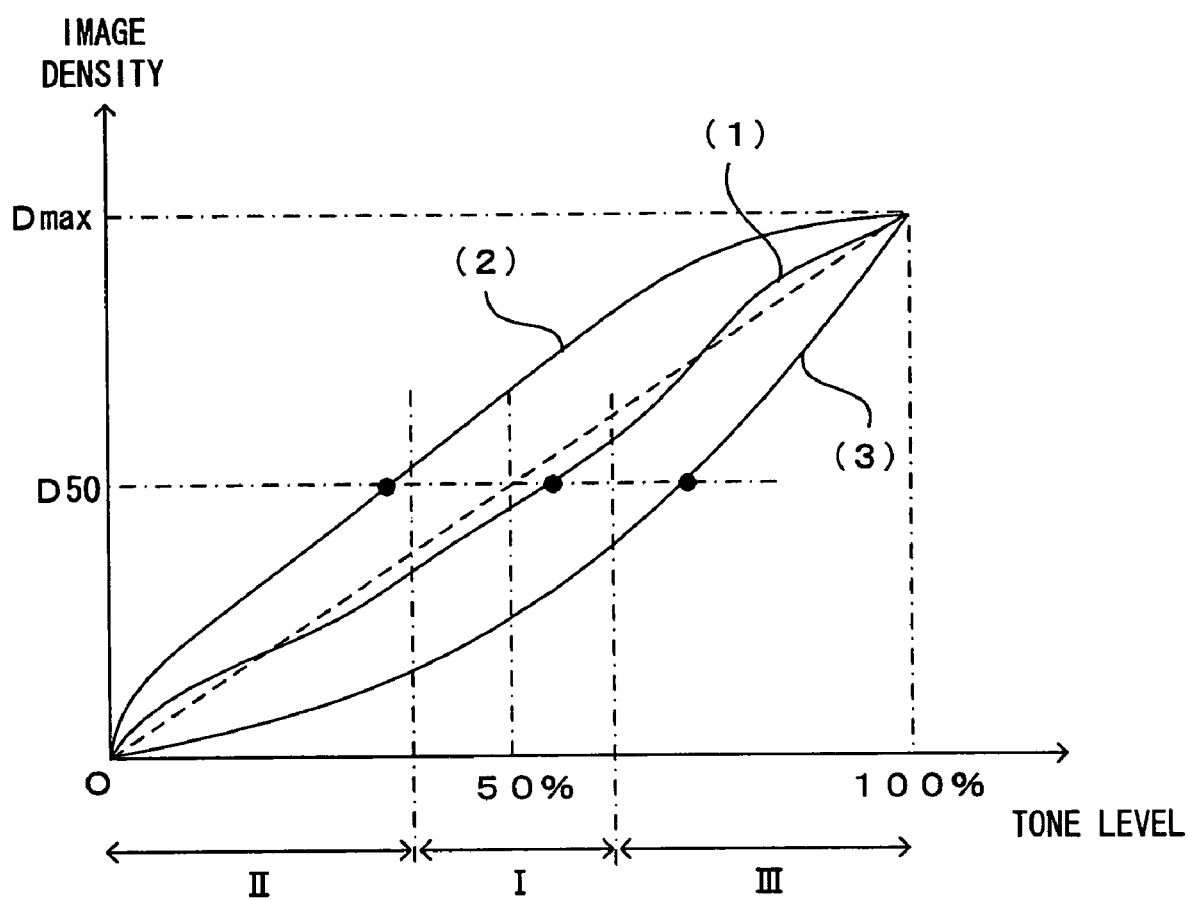
FIG. 18 illustrates another method of defining the correction coefficient based on the densities of the patch images.

FIG. 18 illustrates another method of defining the correction coefficient based on the densities of the patch images. The gamma characteristic of the apparatus of interest may be estimated from the detected densities of the patch images formed at various tone levels. By way of inverse calculation, it is possible to estimate a value of the tone data to be applied to the pulse modulator 117 in order to obtain a desired image density.

Hence, the characteristic of the apparatus may be classified into any of the ranks based on, for example, a value of the tone data related to the density D50. Then, the correction coefficient K for the apparatus may be defined based on the rank thus determined. According to an example shown in FIG. 18, the values of the tone data are classified into three ranks. As indicated by a characteristic curve (1) in the figure, an apparatus presenting an almost linear characteristic has a tone level of about 50% versus the density D50. Thus, the apparatus is classified as Rank I at center. On the other hand, apparatuses each presenting a characteristic indicated by a characteristic curve (2) or (3) are classified as Rank II or Rank III, respectively. In this example, the apparatus tending to form images of the higher densities is given the lower rank in terms of the tone level. According to the gamma characteristic of the apparatus thus classified, the correction coefficient K may be defined as shown in FIG. 17.

Figure 19:
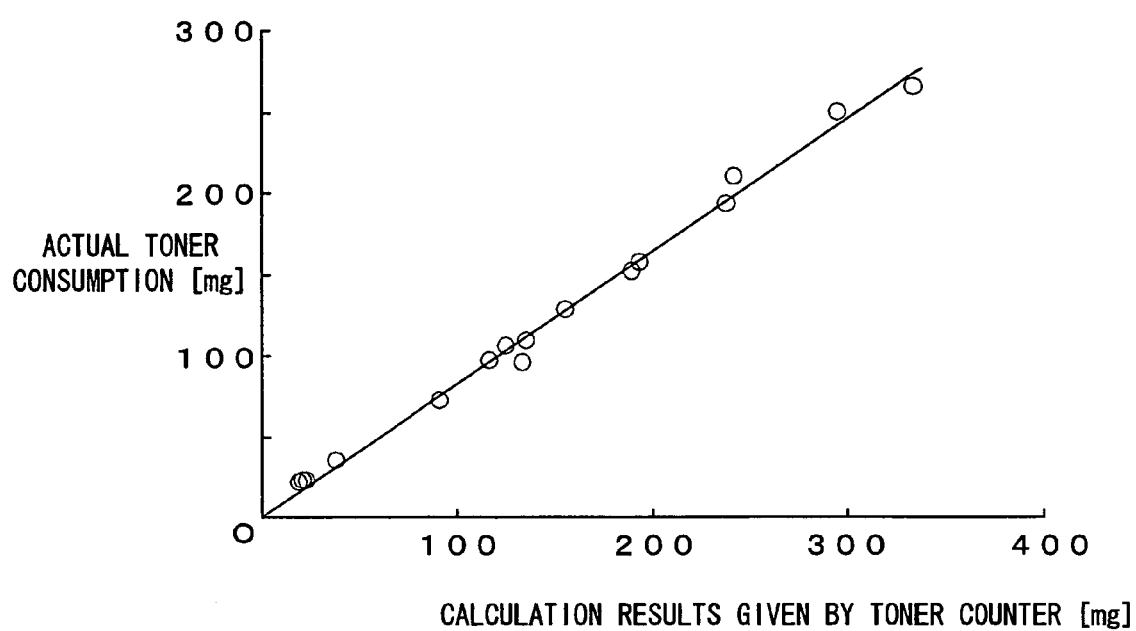
FIG. 19 is a graph showing the calculation results of the toner consumption according to the fourth embodiment.

FIG. 19 is a graph showing the calculation results of the toner consumption according to this embodiment. In the image forming apparatus including the toner counter 202 designed to define the correction coefficient K in the aforementioned manner, the image forming process was carried out under various conditions and the toner consumptions calculated by the toner counter 202 were compared with the measured values. As shown in FIG. 19, a definite correlation (correlation coefficient $R^2$=0.9934) was obtained between these values. It was thus confirmed that this method provides the high-accuracy determination of the toner consumption.

2-6. Summary of the Embodiments

In each of the image forming apparatuses according to the foregoing embodiments, as described above, the toner consumption is determined based on the per-toner-dot tone value of the tone data generated in correspondence to the input image signal. That is, the toner consumption is calculated by multiplying the integrated tone values by the proportionality constant. In this multiplication process, the proportionality constant is defined according to the gamma characteristic of the apparatus in consideration of the varied gamma characteristic thereof. This ensures that the amount of toner consumed in the image formation process is determined with high accuracies irrespective of the varied characteristics of the apparatus. The gamma characteristic of the apparatus may be estimated from the use conditions of any one of process units constituting the apparatus, which include the developers, the photosensitive member cartridges and such. Furthermore, the gamma characteristic may also be estimated from the detected densities of the patch images.

Furthermore, the apparatus is designed such that the gamma characteristic thereof is roughly estimated based on the operating circumstances of the individual parts of the apparatus such as the characteristics or use histories of the developer mounted therein and of the photosensitive member, and the set values of the parameters defining the operating conditions of the apparatus, and that the proportionality constant is properly changed according to the estimated characteristic. Therefore, the apparatus can determine the toner consumption more accurately and reliably no matter how the operating circumstances of the apparatus may vary.

It is also possible to determine the amount of toner consumed by the overall apparatus more accurately by adding the offset value which is equivalent to the amount of consumed toner other than that used for the image formation.

According to the image forming apparatus, the toner counter and the calculation method of toner consumption proposed by the invention, the amount of toner consumed in the image forming apparatus may be determined with high accuracies irrespective of the varied gamma characteristic of the apparatus.

In the foregoing embodiments, the engine EG functions as "image forming unit" of the invention. The toner counter 202 provided at the engine controller 10 is equivalent to a "toner-consumption calculator" and a "toner counter" of the invention. The coefficient K by which the dot count is multiplied is equivalent to "correction information" and a "correction coefficient" of the invention. The developers 4Y and the like, which are removably attachable to the apparatus body, as well as the photosensitive member cartridge 2 are equivalent to "process units" of the invention. Furthermore, the CPU 101 operative to execute the tone control process and to define the correction coefficient based on the detected densities of the patch images function as a "definition unit" of the invention.

It is to be noted that the invention is not limited to the foregoing embodiments and various changes and modifications than the above may be made thereto unless such changes and modifications depart from the scope of the invention. For instance, the image forming apparatuses of the foregoing embodiments each perform the tone correction on the input image signal in order to prevent the gamma characteristic thereof from causing the variations of image quality. However, whether the tone correction is performed or not, there still exist the variations of toner consumption which are attributable to the gamma characteristic of the apparatus, as described above. Therefore, the invention may effectively be applied to a case where the tone correction is not performed.

While the foregoing embodiments take the steps of integrating the values of the tone data, and multiplying the integrated value by the correction coefficient, the same results may naturally obtained if the order of the calculation steps is changed. That is, the same result is given by multiplying the respective values of the tone data by the correction coefficient, followed by integrating the individual products.

Furthermore, the foregoing embodiments adopt, for example, the approach wherein the gamma characteristic of the apparatus is classified into any of the three ranks and the correction coefficient is defined according to the rank so determined. However, the invention is not limited to this approach. A more fine classification may be adopted. Alternatively, the correction coefficient may be defined by calculation using a numerical value corresponding to the gamma characteristic.

While the fourth embodiment mentioned above defines the correction coefficient K based on the detected density of the patch image P50 having the tone value of 50%, for example, a patch image having another tone value may be used for defining the correction coefficient. In the light of defining the correction coefficient according to the actual state of the apparatus, however, it is preferred to use a half-toned toner image, the density of which reflects the gamma characteristic of the apparatus and the contents of signal processing more apparently.

The invention is not limited to the foregoing embodiments and is also applicable to, for example, an apparatus including only a developing device for a black toner for forming a monochromatic image, an apparatus including a transfer medium (such as a transfer drum, or a transfer sheet) other than the intermediate transfer belt, and other image forming apparatuses such as copiers and facsimile machines.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An image forming apparatus forming a toner image corresponding to an image signal, comprising:
   a signal processor which processes the image signal thereby generating a multivalued signal relating to a toner dot to be formed;
   an image forming unit which forms the toner dot according to the multivalued signal thereby forming the toner image corresponding to the image signal; and
   a toner-consumption calculator which calculates a toner consumption in the image forming unit based on the multivalued signal,
   wherein the toner-consumption calculator calculates the toner consumption by integrating values of the multivalued signal and by correcting thus integrated value based on predetermined correction information corresponding to a content of the signal processing of the signal processor, and
   wherein the signal processor performs tone correction on the multivalued signal according to a gamma characteristic of the image forming apparatus and then outputs the multivalued signal thus corrected.

2. An image forming apparatus of claim 1, wherein the toner-consumption calculator calculates the toner consumption by multiplying a cumulative value of the values of the multivalued signal by a correction coefficient as the correction information.

3. An image forming apparatus of claim 2, wherein the toner-consumption calculator calculates the toner consumption by adding an offset value based on use conditions of the image forming apparatus to the multiplication product.

4. An image forming apparatus forming a toner image corresponding to an image signal, comprising:
   a signal processor which processes the image signal thereby generating a multivalued signal relating to a toner dot to be formed;
   an image forming unit which forms the toner dot according to the multivalued signal thereby forming the toner image corresponding to the image signal; and
   a toner-consumption calculator which calculates a toner consumption in the image forming unit based on the multivalued signal,
   wherein the toner-consumption calculator calculates the toner consumption by integrating values of the multivalued signal and by correcting thus integrated value based on predetermined correction information corresponding to a content of the signal processing of the signal processor, and
   wherein the toner-consumption calculator calculates the toner consumption based on the correction information defined according to a gamma characteristic of the image forming apparatus.

5. An image forming apparatus forming a toner image corresponding to an image signal, comprising:
   a signal processor which processes the image signal thereby generating a multivalued signal relating to a toner dot to be formed;
   an image forming unit which forms the toner dot according to the multivalued signal thereby forming the toner image corresponding to the image signal;
   a toner-consumption calculator which calculates a toner consumption in the image forming unit based on the multivalued signal, wherein the toner-consumption calculator calculates the toner consumption by integrating values of the multivalued signal and by correcting thus integrated value based on predetermined correction information corresponding to a content of the signal processing of the signal processor; and
   a definition unit which defines the correction information according to a gamma characteristic of the image forming apparatus, using a detected density of a toner image formed as a patch image by the image forming unit.

6. An image forming apparatus forming a toner image corresponding to an image signal, comprising:
 a signal processor which processes the image signal thereby generating a multivalued signal relating to a toner dot to be formed;
 an image forming unit which forms the toner dot according to the multivalued signal thereby forming the toner image corresponding to the image signal; and
 a toner-consumption calculator which calculates a toner consumption in the image forming unit based on the multivalued signal,
 wherein the toner-consumption calculator calculates the toner consumption by correcting values of the multivalued signal based on predetermined correction information corresponding to a content of the signal processing of the signal processor and by integrating thus corrected values, and
 wherein the signal processor performs tone correction on the multivalued signal according to a gamma characteristic of the image forming apparatus and then outputs the multivalued signal thus corrected.

7. A toner counter for use in an image forming apparatus which processes an image signal for generating a multivalued signal relating to a toner dot to be formed and forms a toner image corresponding to the image signal by forming the toner dot based on the multivalued signal,
 the toner counter calculating a toner consumption by integrating values of the multivalued signal and by correcting thus integrated value based on predetermined correction information corresponding to a content of the signal processing on the image signal, and
 wherein tone correction is performed on the multivalued signal according to a gamma characteristic of the image forming apparatus and the multivalued signal thus corrected is output.

8. A toner counter for use in an image forming apparatus which processes an image signal for generating a multivalued signal relating to a toner dot to be formed and forms a toner image corresponding to the image signal by forming the toner dot based on the multivalued signal,
 the toner counter calculating a toner consumption by correcting values of the multivalued signal based on predetermined correction information corresponding to a content of the signal processing on the image signal and by integrating thus corrected values, and
 wherein tone correction is performed on the multivalued signal according to a gamma characteristic of the image forming apparatus and the multivalued signal thus corrected is output.

9. A calculation method of toner consumption executed by an image forming apparatus which processes an image signal for generating a multivalued signal relating to a toner dot to be formed and forms a toner image corresponding to the image signal by forming the toner dots based on said multivalued signal, comprising:
 a step of integrating values of the multivalued signal;
 a step of correcting thus integrated value based on predetermined correction information corresponding to a content of the signal processing on the image signal;
 a step of calculating the toner consumption based on thus corrected value; and
 a step of performing tone correction on the multivalued signal according to a gamma characteristic of the image forming apparatus and outputting the multivalued signal thus corrected.

10. A calculation method of toner consumption executed by an image forming apparatus which processes an image signal for generating a multivalued signal relating to a toner dot to be formed and forms a toner image corresponding to the image signal by forming the toner dots based on said multivalued signal, comprising:
 a step of integrating values of the multivalued signal;
 a step of correcting thus integrated value based on predetermined correction information corresponding to a content of the signal processing on the image signal; and
 a step of calculating the toner consumption based on thus corrected value,
 wherein the correction information is defined according to a gamma characteristic of the image forming apparatus.

11. A calculation method of toner consumption executed by an image forming apparatus which processes an image signal for generating a multivalued signal relating to a toner dot to be formed and forms a toner image corresponding to the image signal by forming the toner dots based on said multivalued signal, comprising:
 a step of integrating values of the multivalued signal;
 a step of correcting thus integrated value based on predetermined correction information corresponding to a content of the signal processing on the image signal;
 a step of calculating the toner consumption based on thus corrected value; and
 a step of defining the correction information according to a gamma characteristic of the image forming apparatus, using a detected density of a toner image formed as a patch image by the image forming unit,
 wherein the toner consumption is calculated by multiplying a cumulative value of the values of the multivalued signal by a correction coefficient as the correction information.

12. A calculation method of toner consumption of claim 11, wherein the toner consumption is calculated by adding an offset value based on the use conditions of the image forming apparatus to said multiplication product.

13. A calculation method of toner consumption executed by an image forming apparatus which processes an image signal for generating a multivalued signal relating to a toner dot to be formed and forms a toner image corresponding to the image signal by forming the toner dots based on said multivalued signal, comprising:
 a step of correcting values of the multivalued signal based on predetermined correction information corresponding to a content of the signal processing on the image signal;
 a step of integrating thus corrected values;
 a step of calculating the toner consumption based on thus integrated value; and
 a step of performing tone correction on the multivalued signal according to a gamma characteristic of the image forming apparatus and outputting the multivalued signal thus corrected.

14. An image forming apparatus comprising:
 an image forming unit which forms a toner image by forming a toner dot based on a multivalued signal relating to the toner dot to be formed; and
 a toner-consumption calculator which calculates a toner consumption in the image forming unit based on the multivalued signal,
 wherein the toner-consumption calculator calculates the toner consumption by correcting a integrated value of the values of the multivalued signal based on predetermined correction information corresponding to a gamma characteristic of the image forming apparatus.

15. An image forming apparatus of claim 14, wherein the toner-consumption calculator calculates the toner consumption by multiplying a cumulative value of the values of the multivalued signal by a correction coefficient as the correction information.

16. An image forming apparatus of claim 15, wherein the toner-consumption calculator calculates the toner consumption by adding an offset value based on use conditions of the image forming apparatus to the multiplication product.

17. An image forming apparatus of claim 14, wherein the image forming unit comprises a process unit removably attachable to an apparatus body, and
wherein the correction information is defined according to a characteristic of the process unit mounted in the apparatus body.

18. An image forming apparatus of claim 14, further comprising a definition unit which defines the correction information according to the gamma characteristic of the image forming apparatus, using a detected density of a toner image formed as a patch image by the image forming unit.

19. An image forming apparatus of claim 18, wherein the image forming unit forms a half-toned toner image as the patch image.

20. An image forming apparatus of claim 18, further comprising a signal processor which receives an image signal and corrects the image signal according to the gamma characteristic of the image forming apparatus thereby generating the multivalued signal,
wherein the definition unit defines a characteristic of the correction process of the signal processor based on the detected density of the patch image.

21. An image forming apparatus of claim 14, wherein the correction information is re-defined according to use conditions of the image forming apparatus.

22. An image forming apparatus of claim 21, wherein the image forming unit further comprises: a photosensitive member charged to a predetermined surface potential; an exposure unit irradiating a light beam onto a surface of the photosensitive member, the light beam on/off controlled based on the multivalued signal; and a control unit capable of changeably setting an intensity of the light beam,
wherein the correction information is re-defined according to a set value of the intensity of the light beam.

23. An image forming apparatus of claim 21, wherein the image forming unit further comprises: a photosensitive member charged to a predetermined surface potential; and an exposure unit irradiating a light beam onto a surface of the photosensitive member, the light beam on/off controlled based on said multivalued signal, are provided at the image forming unit,
wherein the correction information is re-defined according to use conditions of the photosensitive member.

24. An image forming apparatus of claim 23, wherein the correction information is defined according to a thickness of the photosensitive member.

25. An image forming apparatus of claim 23, wherein the correction information is defined according to total length of use time of the photosensitive member.

26. An image forming apparatus of claim 21, wherein the image forming unit comprises:
a latent image carrier carrying thereon an electrostatic latent image corresponding to the multivalued signal;
a toner carrier feeding the toner to a surface of the latent image carrier, and visualizing the electrostatic latent image with the toner as applied with a predetermined developing bias; and
a control unit capable of changeably setting a magnitude of the developing bias,
wherein the correction information is re-defined according to a set value of the developing bias.

27. An image forming apparatus comprising:
an image forming unit which forms a toner image by forming a toner dot based on a multivalued signal relating to the toner dot to be formed; and
a toner-consumption calculator which calculates a toner consumption in the image forming unit based on the multivalued signal,
wherein the toner-consumption calculator calculates the toner consumption by correcting values of the multivalued signal based on predetermined correction information according to a gamma characteristic of the image forming apparatus and by integrating thus corrected values.

28. A toner counter for calculating a toner consumption in an image forming apparatus based on a multivalued signal relating to a toner dot to be formed,
the toner counter calculating the toner consumption by integrating values of the multivalued signal and by correcting thus integrated value based on predetermined correction information corresponding to a gamma characteristic of the image forming apparatus.

29. A toner counter for calculating a toner consumption in an image forming apparatus based on a multivalued signal relating to a toner dot to be formed,
the toner counter calculating the toner consumption by correcting values of the multivalued signal based on predetermined correction information according to a gamma characteristic of the image forming apparatus and by integrating thus corrected values.

30. A calculation method of toner consumption for calculating a toner consumption in an image forming apparatus based on a multivalued signal relating to a toner dot to be formed, comprising:
a step of integrating values of the multivalued signal;
a step of correcting thus integrated value based on predetermined correction information corresponding to a gamma characteristic of the image forming apparatus; and
a step of calculating the toner consumption based on thus corrected value.

31. A calculation method of toner consumption of claim 30, wherein the toner consumption is calculated by multiplying a cumulative value of the values of the multivalued signal by a correction coefficient as the correction information.

32. A calculation method of toner consumption of claim 31, wherein the toner consumption is calculated by adding an offset value based on use conditions of the image forming apparatus to the multiplication product.

33. A calculation method of toner consumption for calculating a toner consumption in an image forming apparatus based on a multivalued signal relating to a toner dot to be formed, comprising:
a step of correcting values of the multivalued signal based on predetermined correction information corresponding to a gamma characteristic of the image forming apparatus;
a step of integrating thus corrected values; and
a step of calculating the toner consumption based on thus integrated value.

* * * * *